US012084914B1

(12) United States Patent
Flannery et al.

(10) Patent No.: US 12,084,914 B1
(45) Date of Patent: *Sep. 10, 2024

(54) GATED BARRIER

(71) Applicant: Regalo International, LLC, Burnsville, MN (US)

(72) Inventors: Mark A. Flannery, Longboat Key, FL (US); Matthew A. Willms, Woodbury, MN (US); Michael P. Lane, Chaska, MN (US)

(73) Assignee: Regalo International, LLC, Burnsville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,358

(22) Filed: Apr. 28, 2023

Related U.S. Application Data

(63) Continuation of application No. 16/297,682, filed on Mar. 10, 2019, now Pat. No. 11,639,630.

(60) Provisional application No. 62/794,952, filed on Jan. 21, 2019.

(51) Int. Cl.
*E06B 9/06* (2006.01)
*E05D 7/04* (2006.01)
*E06B 9/00* (2006.01)

(52) U.S. Cl.
CPC .................. *E06B 9/06* (2013.01); *E05D 7/04* (2013.01); *E05Y 2800/426* (2013.01); *E05Y 2900/40* (2013.01); *E06B 2009/002* (2013.01)

(58) Field of Classification Search
CPC ........ E06B 2009/002; E06B 9/04; E06B 9/02; E06B 2009/015; E06B 9/06; E05D 7/04
See application file for complete search history.

(56) References Cited

U.S. PATENT DOCUMENTS

| | | | | |
|---|---|---|---|---|
| 5,123,768 | A * | 6/1992 | Franklin | F16C 11/10 403/96 |
| 5,530,977 | A | 7/1996 | Wang | |
| 6,595,498 | B1 * | 7/2003 | Andersen | E06B 9/04 256/26 |
| 6,851,135 | B1 | 2/2005 | Chen | |
| 7,552,513 | B2 * | 6/2009 | Cheng | E06B 9/04 16/334 |
| 7,887,029 | B2 | 2/2011 | Flannery | |
| 7,975,431 | B2 | 7/2011 | Flannery | |
| 9,103,368 | B2 | 8/2015 | Mendes | |
| 9,689,197 | B1 | 6/2017 | Flannery | |
| 9,874,055 | B1 | 1/2018 | Flannery | |

(Continued)

OTHER PUBLICATIONS

Regalo Double Door Super Wide Safety Gate Model 1348; https://regalo-baby.com/products/double-door-super-wide-baby-gate-and-play-yard; Manual retrieved from Archived version: https://web.archive.org/web/20171222085525/http://regalo-baby.com/double-door-super-wide-baby-gate-and-play-yard (Year: 2017) (Year: 2017).*

(Continued)

*Primary Examiner* — Abe Massad

(57) ABSTRACT

A gated barrier that includes a barrier frame first portion, a barrier frame second portion, and a gate between the barrier frame first and second portions. The barrier frame first and second portions include first and second threshold portions that are spaced apart from each other and held in such a spaced apart orientation by a rigid elongate piece. The gated barrier further includes a latch apparatus, panels, and junction apparatus between the panels.

10 Claims, 27 Drawing Sheets

(56) References Cited

U.S. PATENT DOCUMENTS

| | | | | |
|---|---|---|---|---|
| 10,533,370 | B1 | 1/2020 | Flannery | |
| 11,035,173 | B1 | 6/2021 | Flannery | |
| 11,066,870 | B1 | 7/2021 | Flannery | |
| 11,707,140 | B1 * | 7/2023 | Flannery ................ | A01K 1/035<br>256/25 |
| 2006/0175028 | A1 | 8/2006 | Askinasi | |
| 2006/0260195 | A1 | 11/2006 | Witman | |
| 2007/0210293 | A1 * | 9/2007 | Cheng ..................... | E04H 17/18<br>256/26 |
| 2008/0185566 | A1 | 8/2008 | Flannery | |
| 2019/0003250 | A1 | 1/2019 | Flannery | |

OTHER PUBLICATIONS

Regalo Double Door Super Wide Safety Model 1348; https://regalo-baby.com/products/double-door-super-wide-baby-gate-and-play-yard; Manual retrieved from Archived version; https://web.archive.org/web/20171222085525/http://regalo-baby.com/double-door-super-wide-baby-gate-and-play-yard (Year: 2017).

* cited by examiner

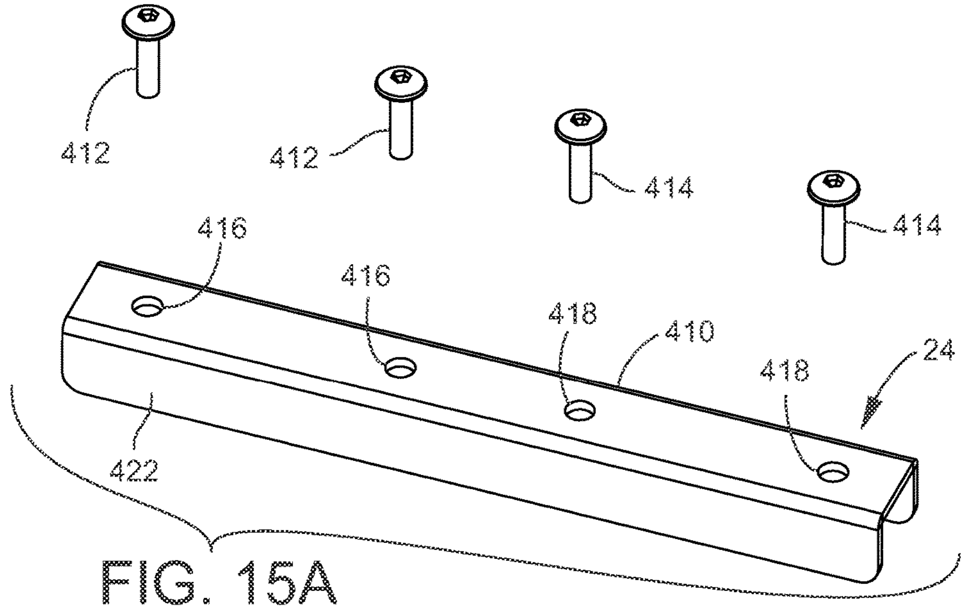
FIG. 15A
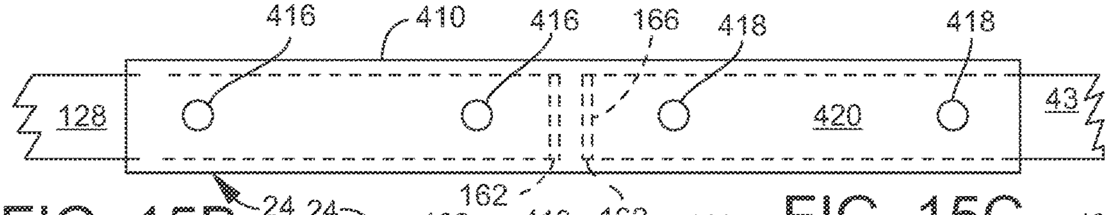
FIG. 15B
FIG. 15C
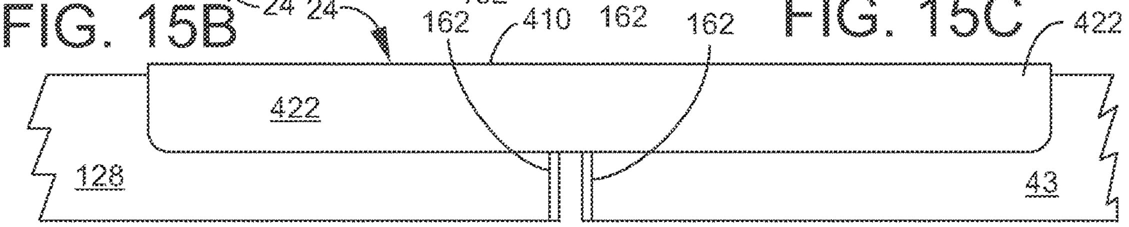
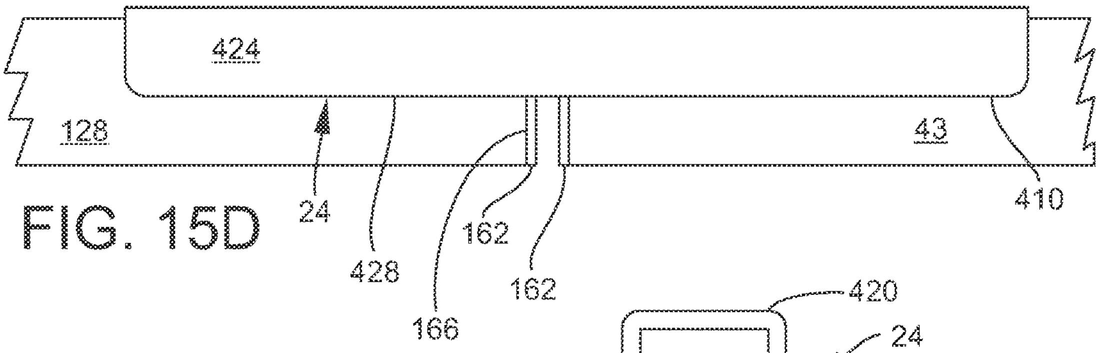
FIG. 15D
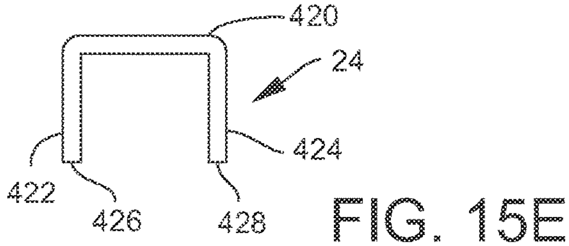
FIG. 15E

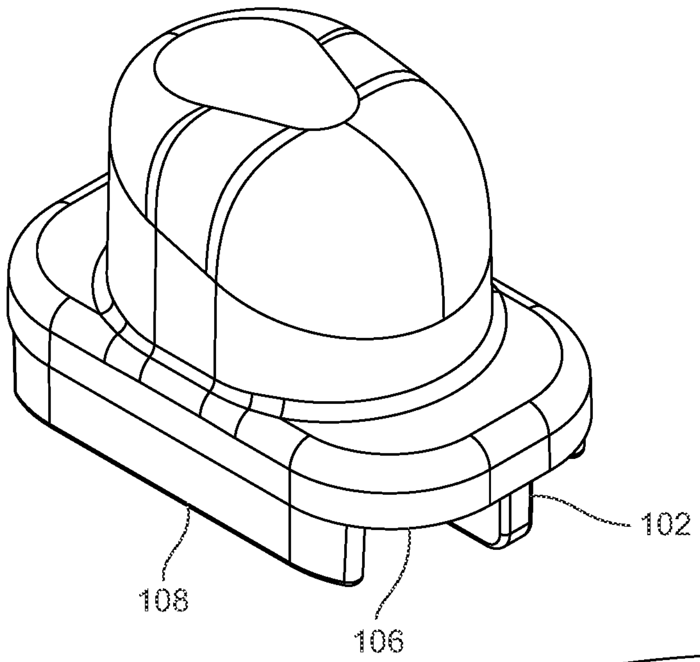
FIG. 21A
FIG. 21B
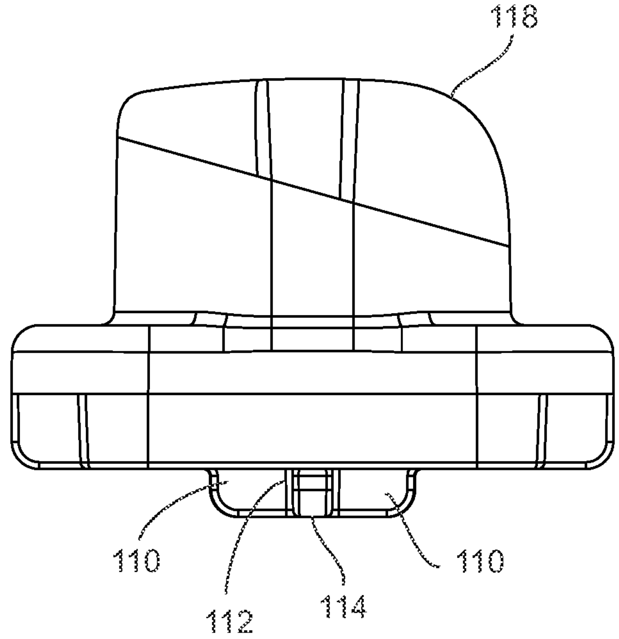
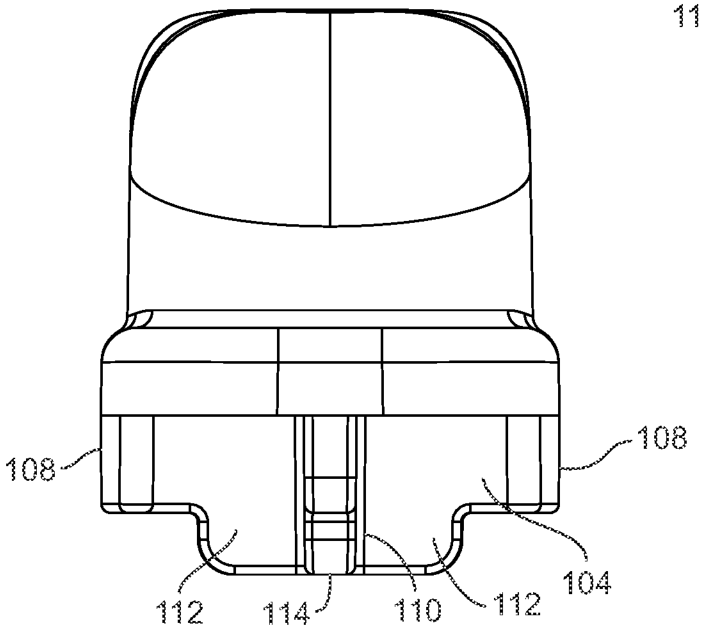
FIG. 21C

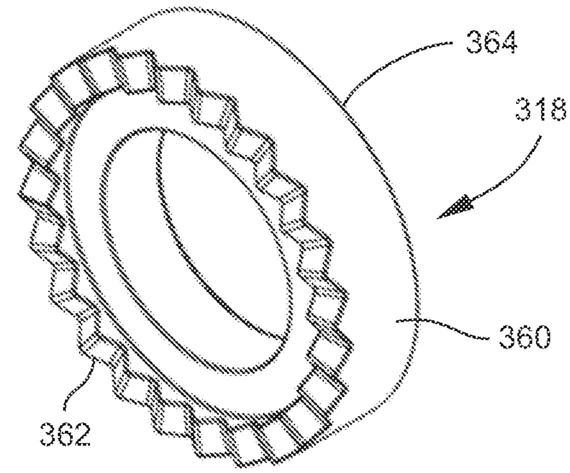
FIG. 22A
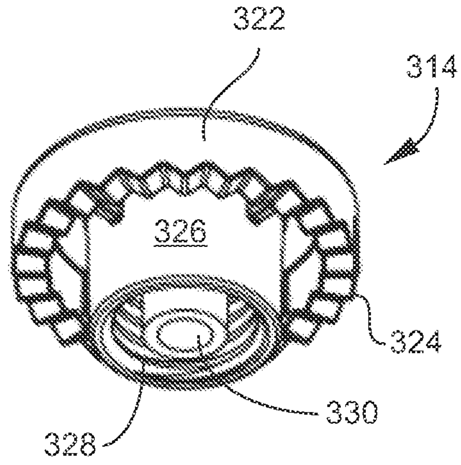
FIG. 22C
FIG. 22B
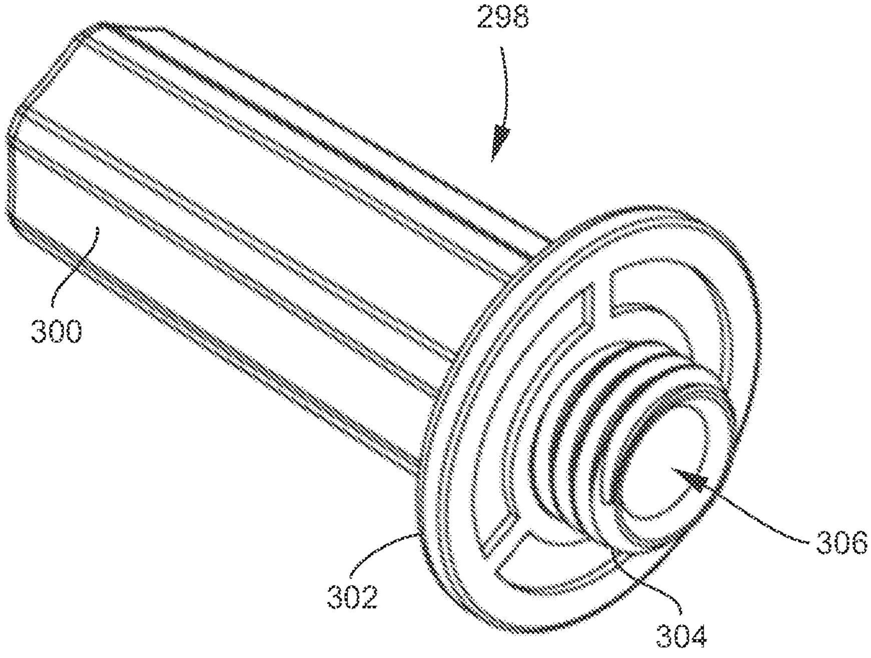

GATED BARRIER

This application is a continuation, and claims the benefit under 35 U.S.C. § 120, of U.S. Nonprovisional patent application Ser. No. 16/297,682 filed Mar. 10, 2019 (U.S. Pat. No. 11,639,630 issued May 2, 2023), which nonprovisional application claims the benefit under 35 U.S.C. 119 (e) of U.S. Provisional Application No. 62/794,952 filed Jan. 21, 2019, all of which applications are hereby incorporated by reference in their entireties into this application.

FIELD OF THE INVENTION

The present invention relates to a barrier having a gate, more particularly relates to a barrier having a gate that is configurable into an infinite number of forms, including an endless form and a form having two ends.

BACKGROUND OF THE INVENTION

Gated barriers are manufactured, shipped, stored in warehouses, occupy space on the retail store shelf, are purchased by the end user, assembled by the end user, disassembled by the end user, and used by infants, toddlers, children, juveniles, teenagers, and adults. Accordingly, there are competing issues across a broad spectrum.

SUMMARY OF THE INVENTION

A feature of the present invention is the provision in a gated barrier, of a barrier frame first portion, of a barrier frame second portion, of a gate between the barrier frame first and second portions, where the barrier frame first portion includes a first standard adjacent to and spaced from the gate, where the barrier frame second portion includes a second standard adjacent to and spaced from the gate, where the barrier frame first portion includes a threshold first portion having a first inner end, where the barrier frame second portion includes a threshold second portion having a second inner end and the second inner end of the threshold second portion is adjacent to the first inner end of the threshold first portion, where the gate is pivotally engaged to the barrier frame first portion, where the gate is removably engaged to the barrier frame second portion.

Another feature of the present invention is the provision in a gated barrier, of a first panel having a first uppermost traversing member and a first lowermost traversing member, where the first uppermost traversing member and first lowermost traversing member are spaced apart by a set of first support members, and of a first uppermost junction and a first lowermost junction, where the first uppermost junction and first lowermost junction engage the barrier frame first portion to the first panel, where the first uppermost junction and first lowermost junction are rotatable such that the first panel and barrier frame first portion are swingable relative to each other.

Another feature of the present invention is the provision in a gated barrier, of a second panel having a second uppermost traversing member and a second lowermost traversing member, where the second uppermost traversing member and second lowermost traversing member are spaced apart by a set of second support members, and of a second uppermost junction and a second lowermost junction, where the second uppermost junction and second lowermost junction engage the barrier frame second portion to the second panel, where the second uppermost junction and second lowermost junction are rotatable such that the second panel and barrier frame second portion are swingable relative to each other.

Another feature of the present invention is the provision in a gated barrier, of the threshold first portion having a bottom defining a first plane, and of the threshold second portion having a bottom defining a second plane, where the first lowermost traversing portion of the first panel includes a bottom defining a third plane, where the second lowermost traversing portion of the second panel includes a bottom defining a fourth plane, where the first and second planes are coplanar, where the third and fourth planes are coplanar, and where the first and second planes are offset from the third and fourth planes.

Another feature of the present invention is the provision in a gated barrier, of the first lowermost junction including a bottom defining a fifth plane and of the second lowermost junction including a bottom defining a sixth plane, where the first, second, fifth, and sixth planes are coplanar.

Another feature of the present invention is the provision in a gated barrier, of the first and second inner ends of the threshold first and second portions being adjacent to each other without engaging each other.

Another feature of the present invention is the provision in a gated barrier, of the threshold first portion being tubular, of the first inner end of the threshold first portion including a first end cap that closes off the first inner end of the threshold first portion such that the first inner end is a closed end, of the threshold second portion being tubular, and of the second inner end of the threshold second portion including a second end cap that closes off the second inner end of the threshold second portion such that the second inner end is a closed end, and of the first and second end caps of the threshold first and second portions being adjacent to each other without engaging each other.

Another feature of the present invention is the provision in a gated barrier, of the first end cap being a first male end cap that includes a first insert that is inserted into the first inner end of the threshold first portion, and of the second end cap being a second male end cap that includes a second insert that is inserted into the second inner end of the threshold second portion.

Another feature of the present invention is the provision in a gated barrier, of a connection between the threshold first portion and the threshold second portion that maintains the threshold first portion and threshold second portion in a straight line with each other, where the connection includes a rigid elongate straight piece having an inverted U-shaped section such that the elongate straight piece is adjacent to a top section of each of the threshold first portion and threshold second portion, such that the elongate straight piece is adjacent to a front side section of each of the threshold first portion and threshold second portion, and such that the elongate straight piece is adjacent to a rear side section of each of the threshold first portion and threshold second portion.

Another feature of the present invention is the provision in a gated barrier, of the threshold first portion being tubular, of the first inner end of the threshold first portion including a first end cap that closes off the first inner end of the threshold first portion such that the first inner end is a closed end, of the threshold second portion being tubular, of the second inner end of the threshold second portion including a second end cap that closes off the second inner end of the threshold second portion such that the second inner end is a closed end, and of the first and second end caps of the threshold first and second portions are adjacent to each other without engaging each other.

Another feature of the present invention is the provision in a gated barrier, of a barrier frame first portion, of a barrier frame second portion, of a gate between the barrier first and second portions, where the barrier frame first portion includes a first standard adjacent to and spaced from the gate, where the barrier frame second portion includes a second standard adjacent to and spaced from the gate, where the barrier frame first portion includes a threshold first portion having a first inner end, where the barrier frame second portion includes a threshold second portion having a second inner end, where the second inner end of the threshold second portion is adjacent to the first inner end of the threshold first portion, where the gate is pivotally engaged to the barrier frame first portion, where the gate is removably engaged to the barrier frame second portion, and of a connection between the threshold first portion and the threshold second portion that maintains the threshold first portion and threshold second portion in a straight line with each other, where the connection includes a rigid elongate straight piece having an inverted U-shaped section such that the elongate straight piece is adjacent to a top section of each of the threshold first portion and threshold second portion, such that the elongate straight piece is adjacent to a front side section of each of the threshold first portion and threshold second portion, and such that the elongate straight piece is adjacent to a rear side section of each of the threshold first portion and threshold second portion.

Another feature of the present invention is the provision in a gated barrier, of the threshold first portion including a bottom defining a first plane, of the threshold second portion including a bottom defining a second plane, and of the first and second planes being coplanar.

Another feature of the present invention is the provision in a gated barrier, of the rigid elongate straight piece being engaged to the threshold first portion by a first pin connector, and of the rigid elongate straight piece being engaged to the threshold second portion by a second pin connector.

Another feature of the present invention is the provision in a gated barrier, of the rigid elongate straight piece being engaged to the threshold first portion by a pair of first pin connectors, and of the rigid elongate straight piece being engaged to the threshold second portion by a pair of second pin connectors.

Another feature of the present invention is the provision in a gated barrier, of the gate being pivotally engaged to the threshold first portion of the barrier frame first portion at a first location, of the gate being engagable to the threshold second portion of the barrier frame second portion at a second location, and of the rigid elongate straight piece being disposed between the first and second locations.

Another feature of the present invention is the provision in a gated barrier, of the gate including a lowermost traversing member, an uppermost traversing member, a first end member adjacent to the first standard of the barrier frame first portion, and a second end member adjacent to the second standard of the barrier frame second portion, where the first and second end members space the lowermost and uppermost traversing members apart from each other, where the rigid elongate straight piece is between the first threshold portion and the lowermost traversing member of the gate, where the rigid elongate straight piece is between the second threshold portion and the lowermost traversing member of the gate, and where the rigid elongate straight piece is adjacent to the lowermost traversing member of the gate.

Another feature of the present invention is the provision in a gated barrier, of the gated barrier being free of traversing members extending between the lowermost traversing member of the gate and the rigid elongate straight piece.

Another feature of the present invention is the provision in a gated barrier, of the gate including a lowermost traversing member, an uppermost traversing member, a first end member adjacent to the first standard of the barrier frame first portion, a second end member adjacent to the second standard of the barrier frame second portion, and first and second internal vertical support members, where the first and second end members and first and second internal vertical support members space the lowermost and uppermost traversing members apart from each other, where the first internal vertical support member is disposed on a straight line that intersects the rigid elongate straight piece and the threshold first portion, and where the second internal vertical support member is disposed on a straight line that intersects the rigid elongate straight piece and the threshold second portion.

Another feature of the present invention is the provision in a gated barrier, of the first and second standards being tubular, of the threshold first and second portions being tubular, of the gate including uppermost and lowermost traversing members that are tubular, of the gate including end support members that are tubular, and of the gate including internal support members that are tubular.

Another feature of the present invention is the provision in a gated barrier, of each of the first and second end caps, that are inserted into the inner confronting ends of the threshold first and second portions, including a vertical through opening such that pin connectors engaging the connection and threshold first and second portions extend into the vertical through opening of the first and second end caps.

An advantage of the present invention it that the gated barrier may be configurable into a number of forms. For example, the gated barrier may be configured into a form having two ends, with the gate being intermediate the two ends. Or the gated barrier may be configured into the form of an endless playyard, where the playyard includes a gate for access into and out of the playyard.

Another advantage is that the gated barrier includes panels that may be added and subtracted as needed such that an endless playyard may be made relatively large or relatively small and such that a relatively straight gated barrier may be made relatively long or relatively short.

Another advantage is that the gate of the gated barrier has an open top such that both adults and children can walk through the gate.

Another advantage is that the gated barrier takes up a minimum space on the retail shelf. One feature contributing to this advantage is that the gate threshold is formed of two parts. Another feature contributing to this advantage is that each of the barrier frame first and second portions may be swung to a connected back to back position with an adjacent panel, and that adjacent panels may be swung to connected back to back positions.

Another advantage of the present invention is that the gated barrier is stable, whether the gated barrier is in a generally straight form or in an endless playyard form. One feature contributing to this advantage is the flat bottom found on the gate threshold portions and lowermost junctions.

Another advantage is that panels are easily swingable. One feature contributing to this advantage is that the bottom faces of the lowermost horizontal support members of the panels are offset from a plane defined by 1) bottommost faces of the junction apparatus between the panels and 2) the bottom faces of the first and second threshold portions such that the bottom faces of the lowermost horizontal support members of the panels are spaced from a hardwood floor, carpet, rug or other terrain.

Another advantage of the present invention is that the gate includes a secure locking handle.

Another advantage is that the gated barrier is safe to use.

Another advantage is that the gated barrier is easy to use for an adult and, at the same time, difficult to use by the young.

BRIEF DESCRIPTION OF THE DRAWINGS

FIG. 15A is a perspective exploded view of the threshold connection between the first and second threshold portions of the gated barrier of FIG. 1.

FIG. 15B is a top, partially phantom view of the threshold connection of FIG. 15A engaged to the threshold portions.

FIG. 15C is a front view of the threshold connection of FIG. 15A engaged to the threshold portions.

FIG. 15D is a rear view of the threshold connection of FIG. 15A engaged to the threshold portions.

FIG. 15E is an end view of either of the ends of the threshold connection of FIG. 15A.

FIG. 21A is a perspective view of the exterior push button for the latch apparatus of FIG. 5.

FIG. 21B is a side view of the exterior push button of FIG. 21A.

FIG. 21C is an end view of the exterior push button of FIG. 21A.

FIG. 22A is a perspective view of a toothed disk end cap for employment in an end and uppermost junction shown in FIG. 3.

FIG. 22B is a perspective view of a turning knob for employment in the junctions between the panels of FIG. 1.

FIG. 22C is a perspective view of a toothed end cap for employment in an end and uppermost junction shown in FIG. 3.

DESCRIPTION

Figure 1:
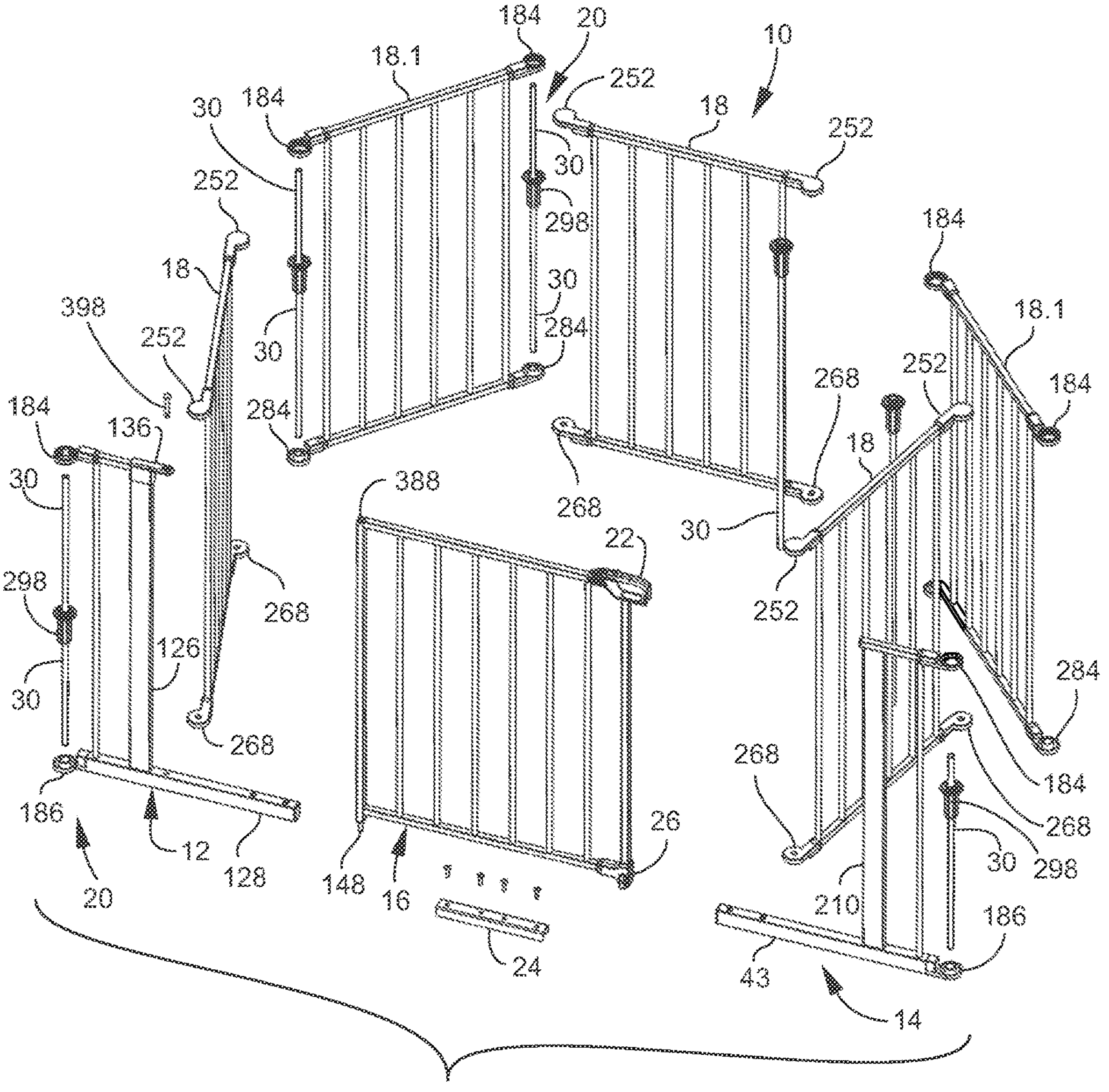
FIG. 1 is a perspective exploded view of the present gated barrier.

As shown in FIG. 1, the present gated barrier is indicated by the reference number 10. Gated barrier 10 includes a barrier frame first portion 12 and a barrier frame second portion 14, a gate 16, a set of panels 18 and 18.1, and a junction apparatus 20 between panel 18 (FIGS. 8 and 9) and panel 18.1 (FIGS. 10 and 11). The junction apparatus 20 is further disposed between the barrier frame first portion 12 and panel 18 and between the barrier frame second portion 14 and panel 18. Gated barrier 10 further includes a latch apparatus 22 or secure locking handle 22, an inverted U-shaped connector 24 for engaging the inner ends of the first and second barrier frame portions 12, 14 to each other in a spaced apart relation, and a third lock apparatus 26.

Figure 2:
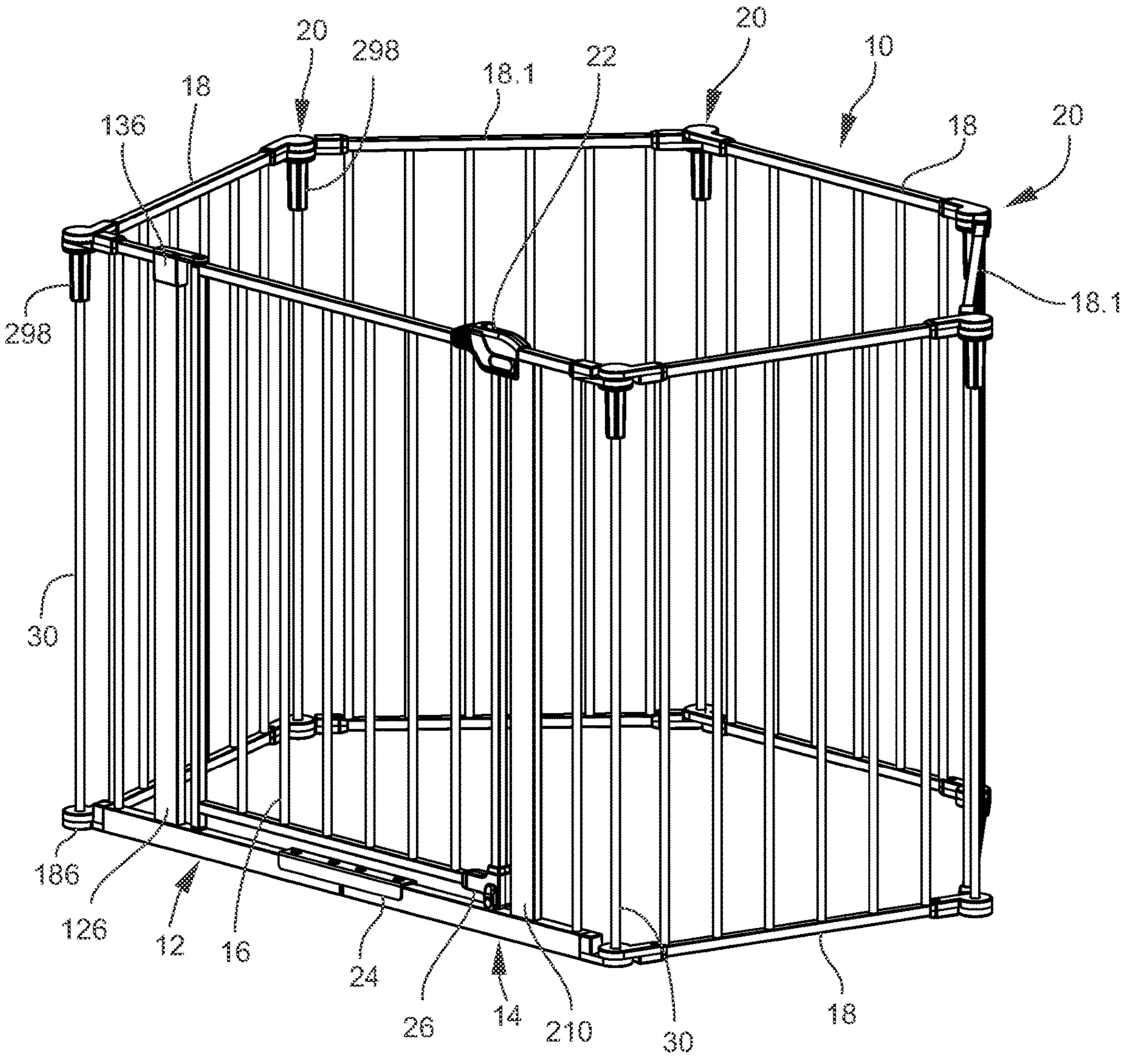
FIG. 2 is a perspective view of the gated barrier of FIG. 1 in a playyard form.

FIG. 2 shows the gated barrier 10 in an endless playyard form. In FIG. 2, the first and second barrier frame portions 12, 14, gate 16, panels 18 and 18.1, and junction apparatus 20 are endlessly engaged to each other.

Figure 3:
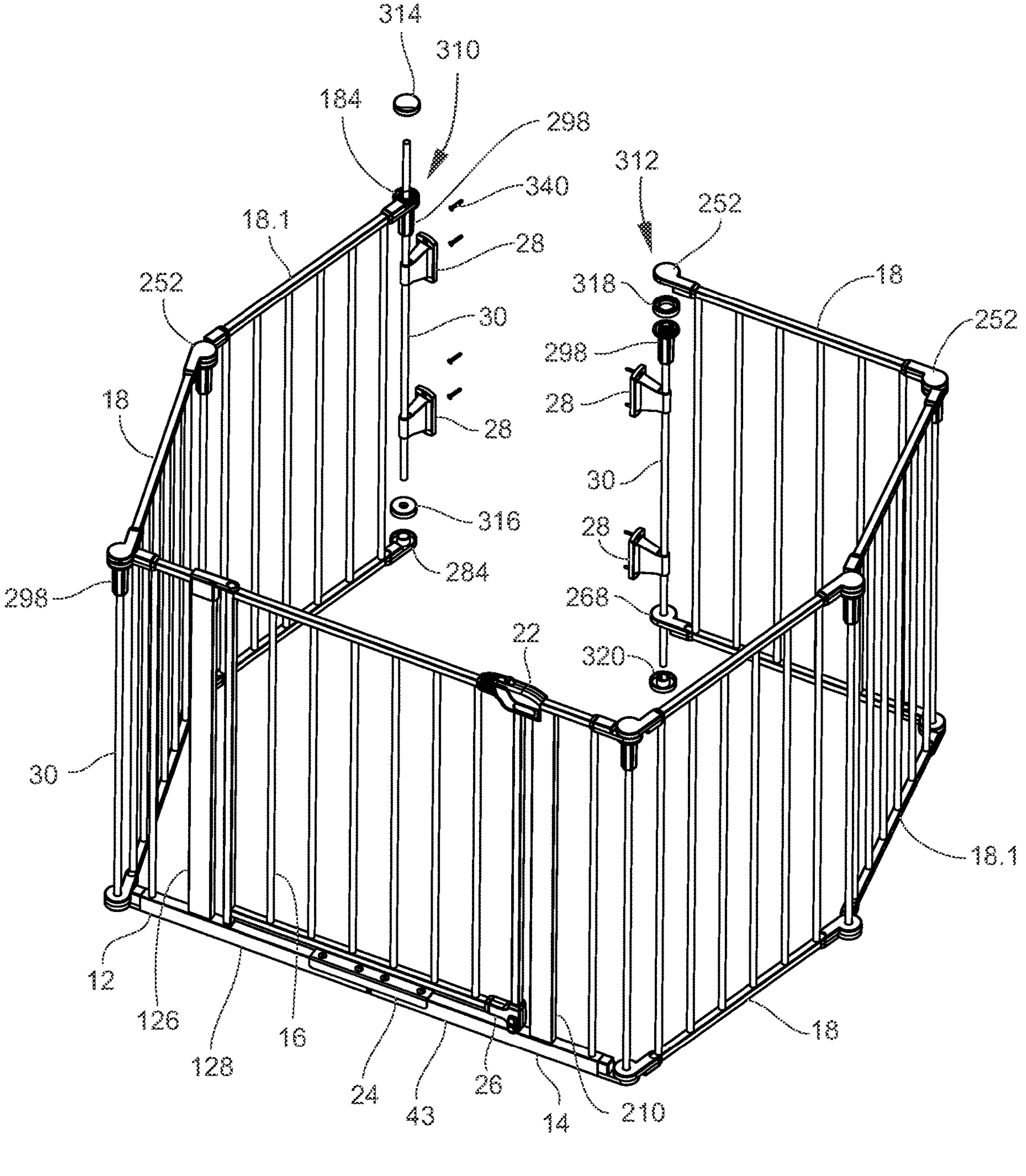
FIG. 3 is a perspective view of the gated barrier of FIG. 1 in a form having two ends.

FIG. 3 shows the gated barrier 10 in a form having two ends where the first and second barrier frame portions 12, 14, gate 16, panels 18 and 18.1, and junction apparatus 20 are not endlessly engaged to each other, but where two otherwise adjacent panels 18 and 18.1 have been separated at one of the junction apparatus 20. In FIG. 2, a first set of two wall mounts 28 are employed to secure a first junction apparatus 20 to a first vertical surface and a second set of two wall mounts 28 are employed to secure a second junction apparatus 20 to a second vertical surface. Each of the junction apparatus 20 includes a tubular vertical removable elongate support member 30. When a non-endless playyard form like FIG. 3 is desired, a supplemental support member 30 is required for one of the ends of the playyard of FIG. 3, as a junction apparatus 20 includes only one support member 30 when junction apparatus 20 engages two adjacent panels 18 and 18.1 to each other.

Figure 4:
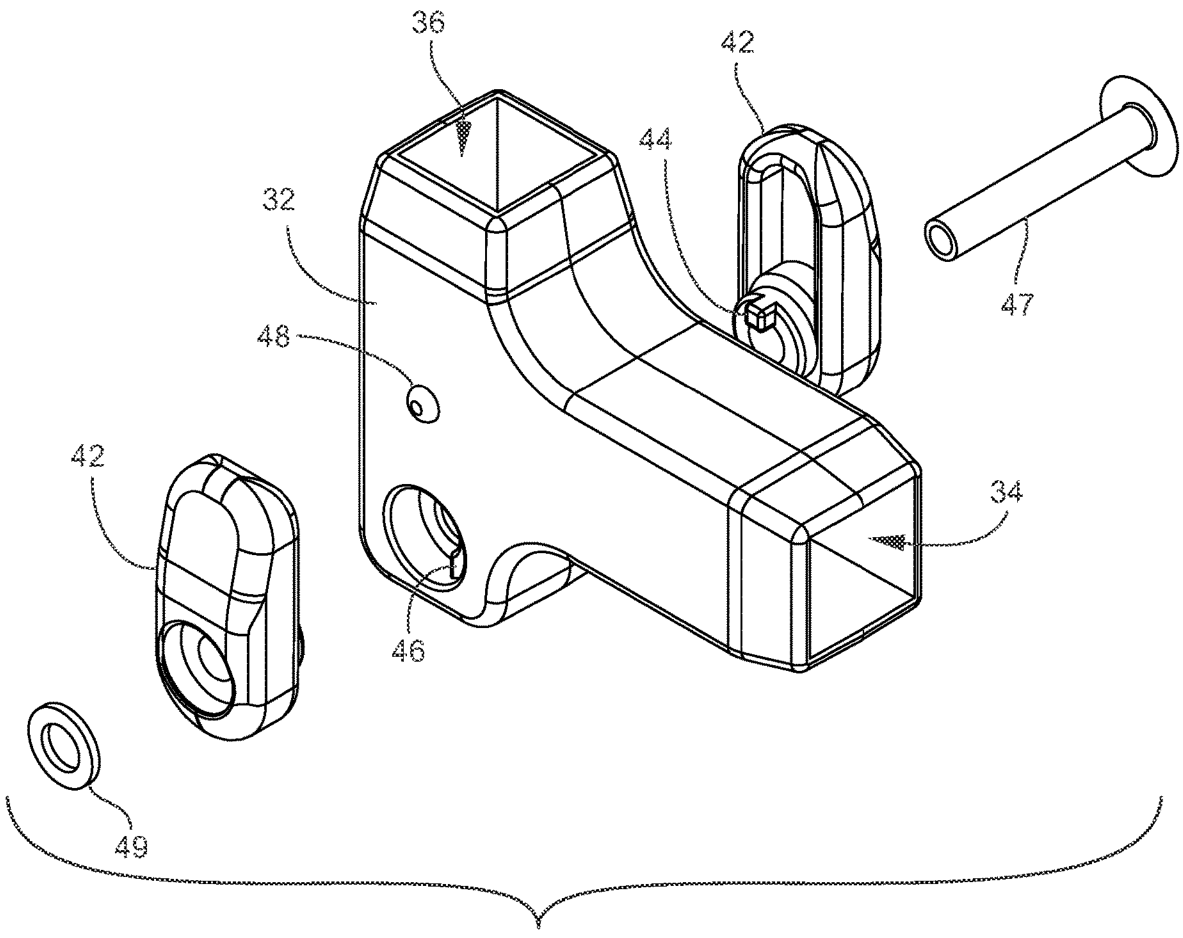
FIG. 4 is a perspective view of a corner connection for the gate of the gated barrier of FIG. 1, where the corner connection engages an upright support member and a horizontal support member of the gate and where the corner connection further includes swinging locks for engaging the threshold of the gated barrier.
Figure 5:
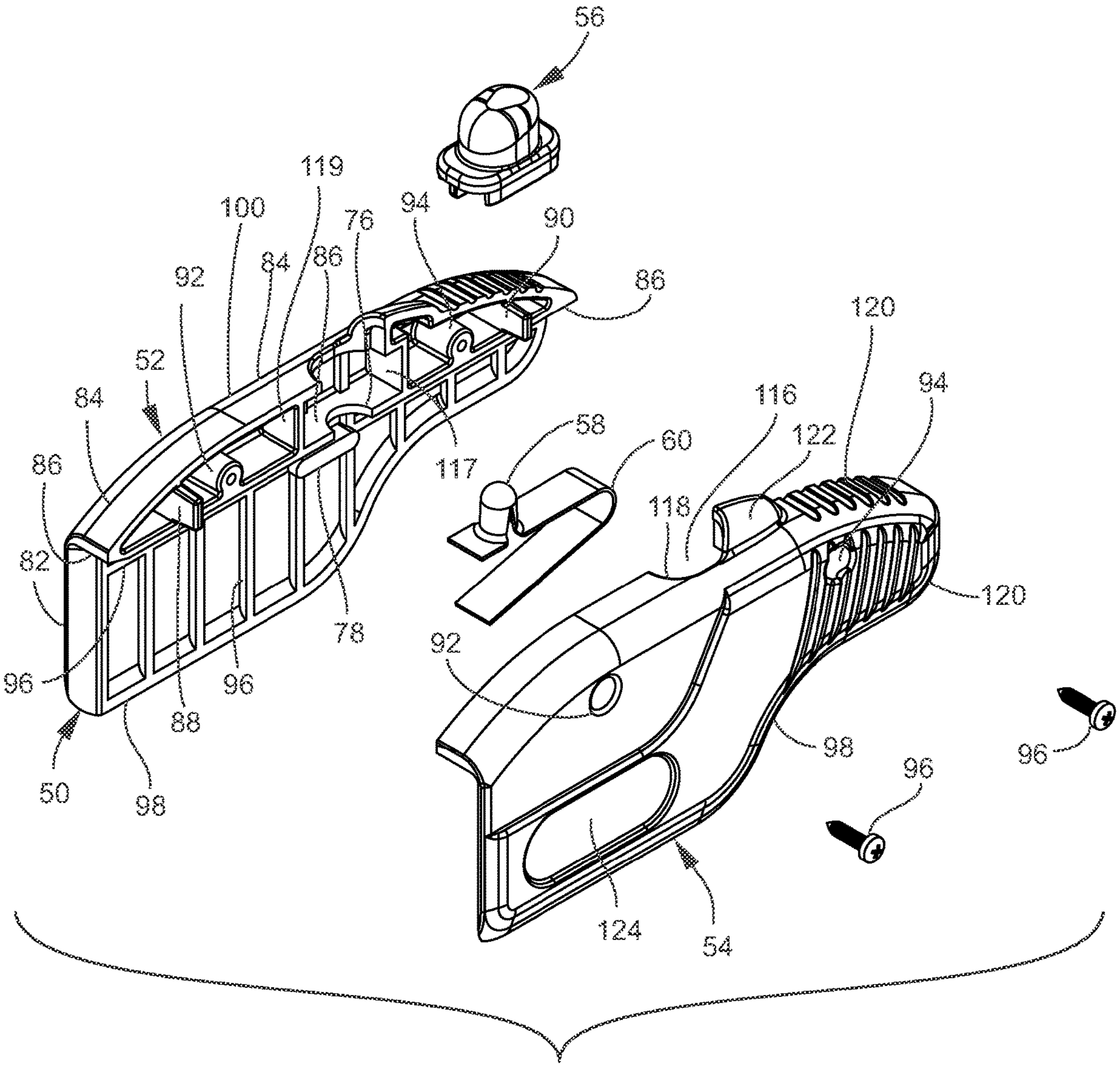
FIG. 5 is an exploded view of the housing for the locking handle apparatus or latch apparatus of the gate of the gated barrier of FIG. 1.
Figure 12:
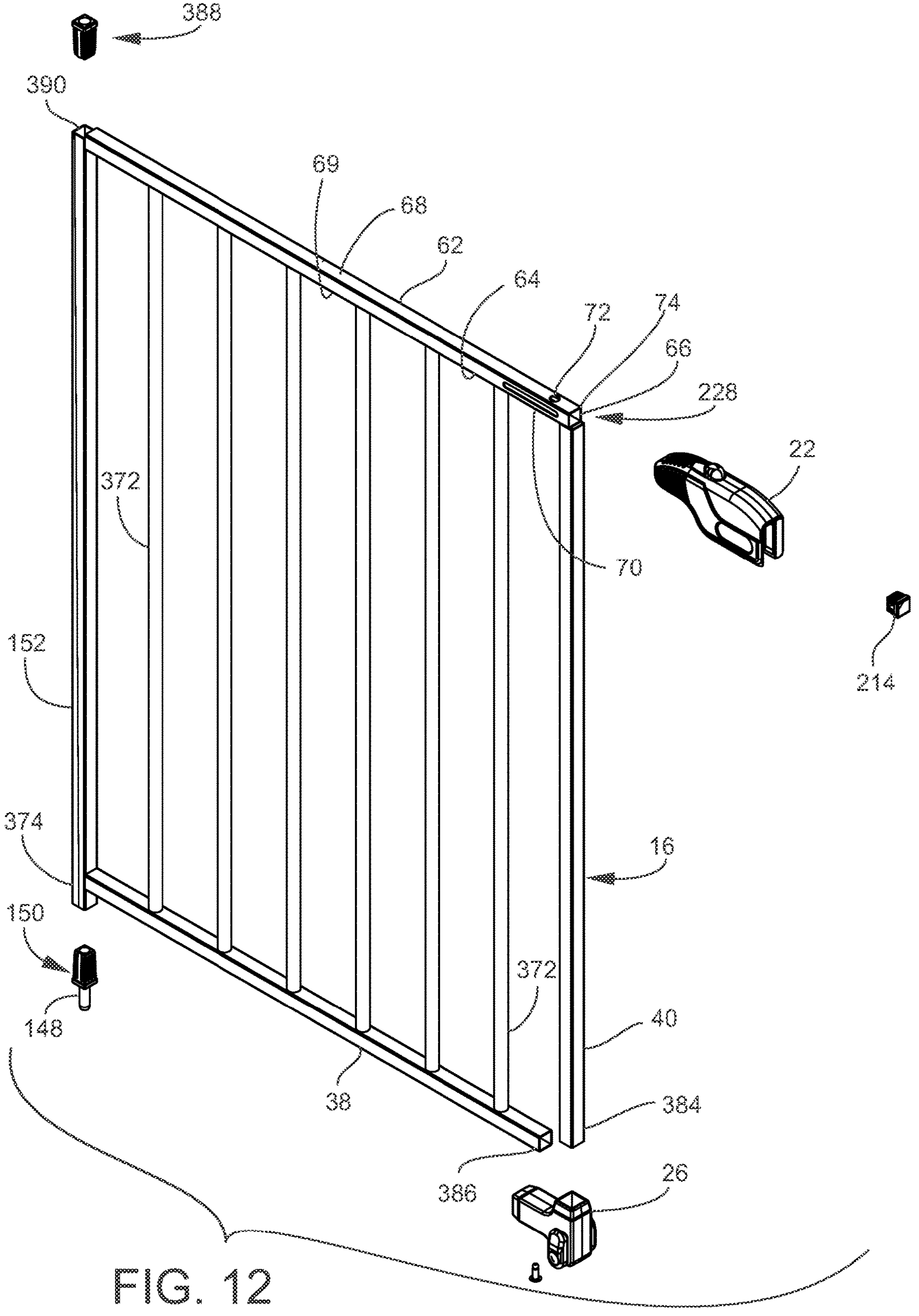
FIG. 12 is a perspective exploded view of the gate of the gated barrier of FIG. 1.
Figure 13:
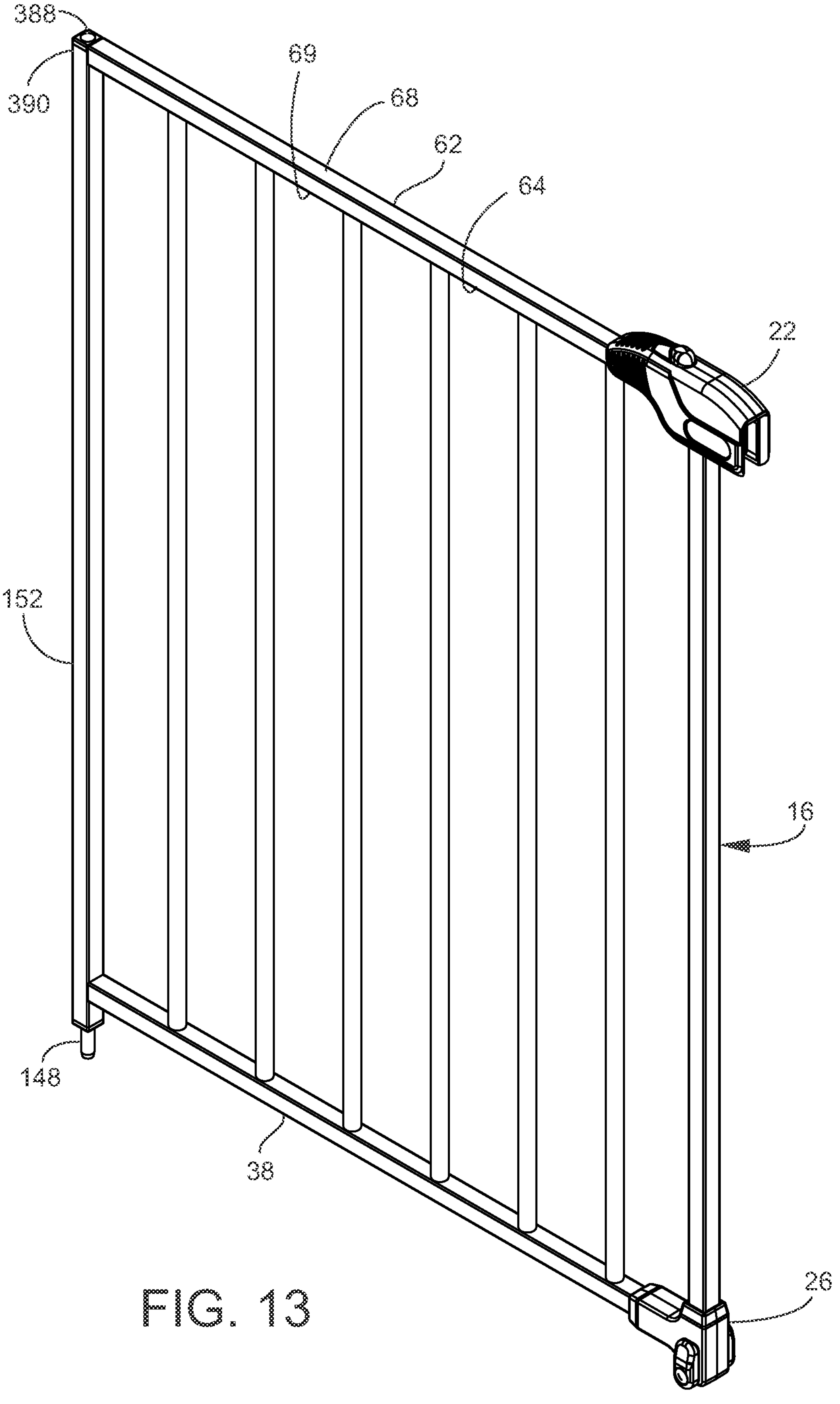
FIG. 13 is a perspective assembled view of the gate of FIG. 12.
Figure 14:
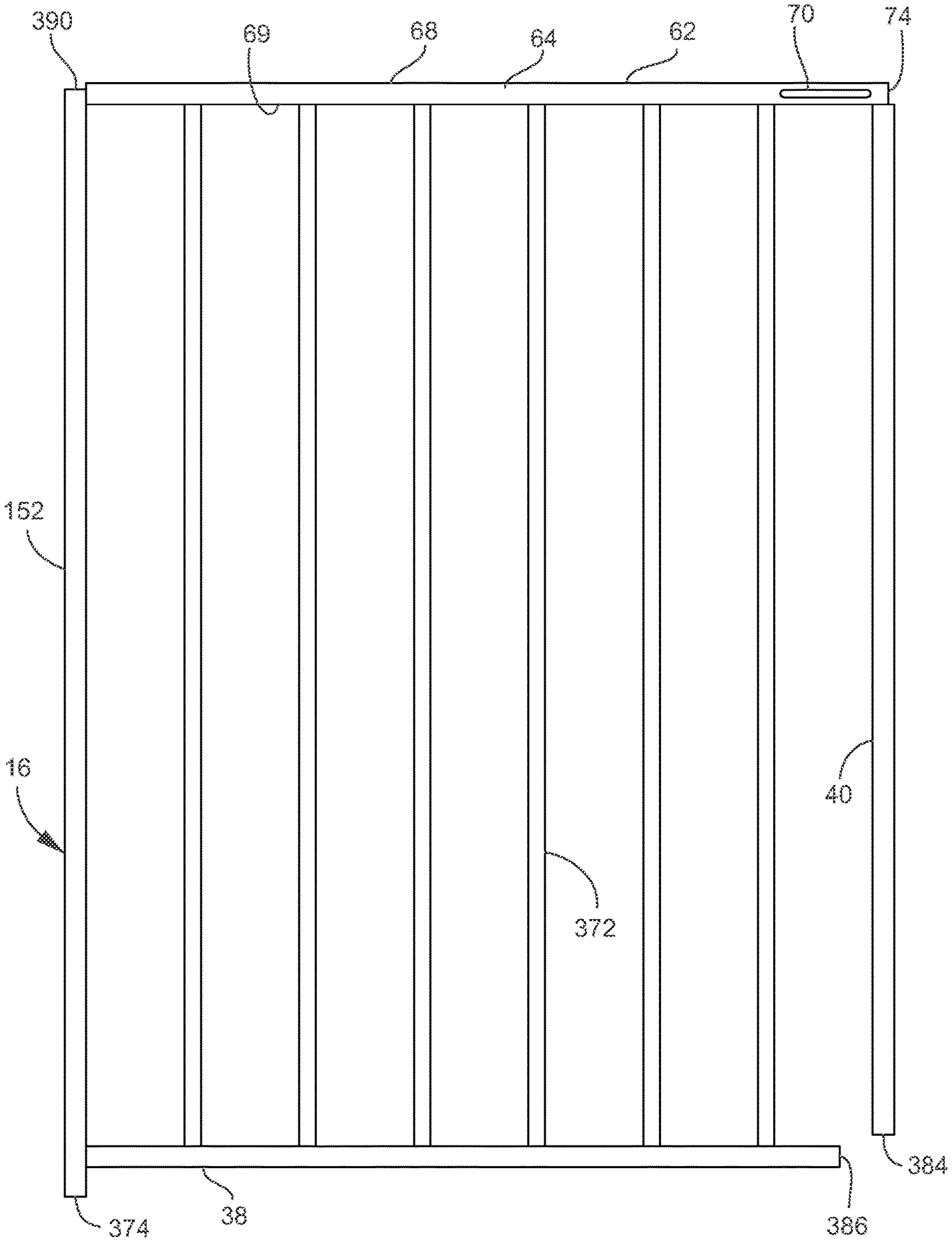
FIG. 14 is an elevation view of a stripped down gate of the gate of FIG. 12.

FIG. 4 is a detail view of the third lock apparatus 26. Third lock apparatus 26 includes a body 32. Body 32 includes a horizontal support member receptor 34 and a vertical support member receptor 36. As shown in FIG. 12, horizontal support member receptor 34 receives a horizontal support member 38 and vertical support member receptor 36 receives a vertical support member 40. The free ends of horizontal support member 38 and vertical support member 40 are adjacent to and spaced from each other. The free ends of the horizontal support member 38 and vertical support member 40 are inserted into the receptors 34, 36, respectively. The body 32 serves as a mount for a pair of arms 42 that swing to and between up and down positions, where the down position brings arms 42 adjacent to respective front or rear faces of the threshold portion 43 of the second barrier frame portion 14. When both arms 42 are pivoted to a down position, the gate 16 cannot swing away from a closed planar position relative to the first and second barrier frame portions 12, 14. When one of the arms 42 is in the down position and the other of the arms 42 is in the up and out of the way position, the gate 16 is swingable only one way away from the connected first and second barrier frame portions 12, 14. Each of the arms 42 includes a tab 44 that engages a lower slot 46. FIG. 4 shows a lower slot 46 that tab 44 engages when arm 42 is in the down position. A pivot pin 47 engages the arms 42 with a pressure mounting such that tab 44 snaps into lower slot 46. When in the up position, side edges of an inner perimeter of arm 42 snap over a nub 48 to maintain the arm 42 in the up position until manually pivoted to the down position. The axis of pin 47 is disposed on or adjacent to an axis of vertical support member 40 and is further disposed below an axis of the horizontal support member 38. Locking washer 49 can engage the distal end of pin 47 to engage the arms 42 to body 32.

FIGS. 5, 17B, 17C, 18A, 18B, 18C, 19A, 19B, 19C, 20A, 20B show the latch apparatus 22 or secure locking handle 22. Latch apparatus 22 includes a housing 50 having a first half portion 52 and a second half portion 54. Latch apparatus 22 further includes an exterior button 56 that operates an interior spring based button 58 on a U-shaped spring 60. The interior spring based button 58 and U-shaped spring 60 combination is set inside the uppermost tubular horizontal support member 62 having a front side 64, a rear side 66, a top side 68, and a bottom side 69. A through slot 70 is formed in each of the front side 64 and rear side 66. A through hole 72 is formed in the top side 68. The outer end of the slot 70 is spaced from an open end 74 of the uppermost tubular horizontal support member 62. The through hole 72 is spaced from the end 74 of the uppermost tubular horizontal support member 62. The through hole 72 is adjacent to the outer end of the slot 70. During assembly, the U-shaped spring 60 is inserted through the open end 74 until the interior button 58 snaps out of the through hole 72. Once set in place, the U-shaped spring 60 presses resiliently downwardly against the bottom side 69 of the uppermost tubular horizontal support member and upwardly against the top side 68 of the uppermost tubular horizontal support member. Once set in place, the U-shaped spring 60 does not slide axially in the uppermost tubular horizontal support member 62, but is compressed when the exterior button 56 presses down upon the interior button 58. When pressure upon the exterior button 56 is released, the U-shaped spring 60 resiliently pushes the interior button 58 upwardly through an opening 76 in housing 50 to lock the housing 50 relative to the gate 16 if the opening 76 is aligned with opening 72 of the uppermost tubular horizontal support member 62.

Each of the housing half portions 52, 54 includes an elongate or oblong tab 78 with circular ends that engages one of the through slots 70. Elongate tab 78 includes a front end that hits the outer end of its respective slot 70, which front end abutment defines the forward most sliding position of housing 50, where the front end or nose of housing 50 captures or engages the inner end of the uppermost tubular horizontal support member 80 so as to prevent the gate 16 from being swung open either forwardly or rearwardly. Elongate tab 78 includes a rear end that hits the inner end of its respective slot 70, which rear end abutment defines the rearmost sliding position of housing 50, where the front end or nose of housing 50 is out of the way of the inner end of the uppermost tubular horizontal support member 80 such that gate 16 may be swung open either forwardly or rearwardly. Elongate tab 78 is disposed directly under the opening 76.

Each of the housing half portions 52, 54 are generally L-shaped so as to have a side portion 82 and a top portion

84. When the top portions 84 abut each other, the side portions 82 are spaced apart and the uppermost tubular horizontal support member 62 and inner end of the uppermost horizontal support member 50 are received in the housing 50 and between the side portions 82. The top portion 84 includes a horizontally extending ledge 86 that rides on the top side 68 of the uppermost tubular horizontal support member 62 of the gate 16 and that further rides on the top side of the inner end of the uppermost tubular horizontal support member 80. Housing half portion 52 includes a pair of rearward and frontward tabs 88, 90 that extend laterally beyond ledge 86 to engage slots 89, 91 formed in housing half portion 54. Each of the housing half portions 52, 54 includes rearward and frontward cylindrical pin mounts 92, 94 that engage threaded pin connectors 96 for engaging the housing half portions 52, 54 to each other to form the housing 50. Each of the housing half portions 52, 54 includes a network of vertically and horizontally extending ribs 96. Each of the housing half portions 52, 54 includes a perimeter bottom edge 98 that undulates from a rear portion to a front portion. The shape of the perimeter bottom edge 98 permits an ergonomic grip for the hand of a user. The top portion 84 is the portion of each of the housing half portions 52, 54 that is located between the horizontal ledge 86 and a perimeter top edge 100. Tabs 88, 90, pin mounts 92, 94 are disposed in the top portion 84. Further disposed in the top portion 84 is the lower half of the exterior button 56.

Exterior button 56 is shown in FIGS. 21A, 21B, and 21C. Exterior button 56 includes a longitudinally running vertical center wall 102 and a laterally running vertical center wall 104 that depend from a base 106. Exterior button 56 further includes a pair of longitudinally running side walls 108 that extend parallel to the longitudinally running vertical center wall 102. Longitudinally running vertical center wall 102 includes a central wall lower portion 110 that depends lower than the side walls 108. Laterally running vertical center wall 104 includes a central wall lower portion 112 that depends lower than the side walls 108. Lower portions 110, 112 form a junction 114. Junction 114 is disposed immediately over the axis of interior button 58 of spring 60. Lower portions 110, 112 and junction 114 depend into through opening 76 to a depth of the lower face of ledge 86 so as to press interior button 58 to a recessed out of the way position so that the housing 50 can slide back and forth, as far as elongate tabs 78 and slots 70 permit, to engage and disengage the front end or nose of the housing 50 with the inner end of the uppermost tubular horizontal support member 80 of the barrier frame second portion 14. The bottom edges of side walls 108, portions of longitudinal wall 102, and portions of lateral wall 104 abut the upper face of ledge 86 when the interior button 58 is pushed down by the exterior button 56 such that the height of lower portions 110, 112 is equal to the thickness of the ledge 86. Base 106 includes a width and length greater than an opening 116 formed in each of the housing half portions 52, 54 so that exterior button 56 remains contained in the housing 50. Exterior button 56 has minimal or no frontward and rearward movement in housing 50 as the base 106 abuts interior vertical walls 117, 119 of the housing half portions 52, 54. Exterior button 56 has minimal or no sideways movement in the housing 50 as the base 106 abuts inner features of the side portions 82 of the housing half portions 52, 54. Base 106 is lifted upwardly by the interior button 58 when housing 50 is slid so that opening 76 is aligned with interior button 58. Opening 116 is formed by a perimeter edge 118 that is about equal to the circumference of the cap 118 that extends upwardly from the base 106. The finger of a user presses upon the cap 118 to depress the exterior button 56. The cap 118 extends outwardly of the body 50. The front end of the housing 50 includes ribs 120 on the side portion 84 and top portion 86. A ramp 122 extends from the ribs 120 on the top portion 86 upwardly and rearwardly to terminate at the top of the cap 118. When the exterior button 56 is fully pressed upwardly by the interior button 58, the top of the cap 118 is about flush with a top rear portion of the ramp 122 and side portions of the ramp are about flush with side portions of the cap 118 so as to generally hide the cap 118 behind the ramp 122 such that the user has a visual signal when the exterior button 56 is depressed and extended. Each of the outer surfaces of the housing half portions 52, 54 includes an oblong depression 124 having circular ends where a company or brand name plate may be engaged.

Figures 6A, 6B:
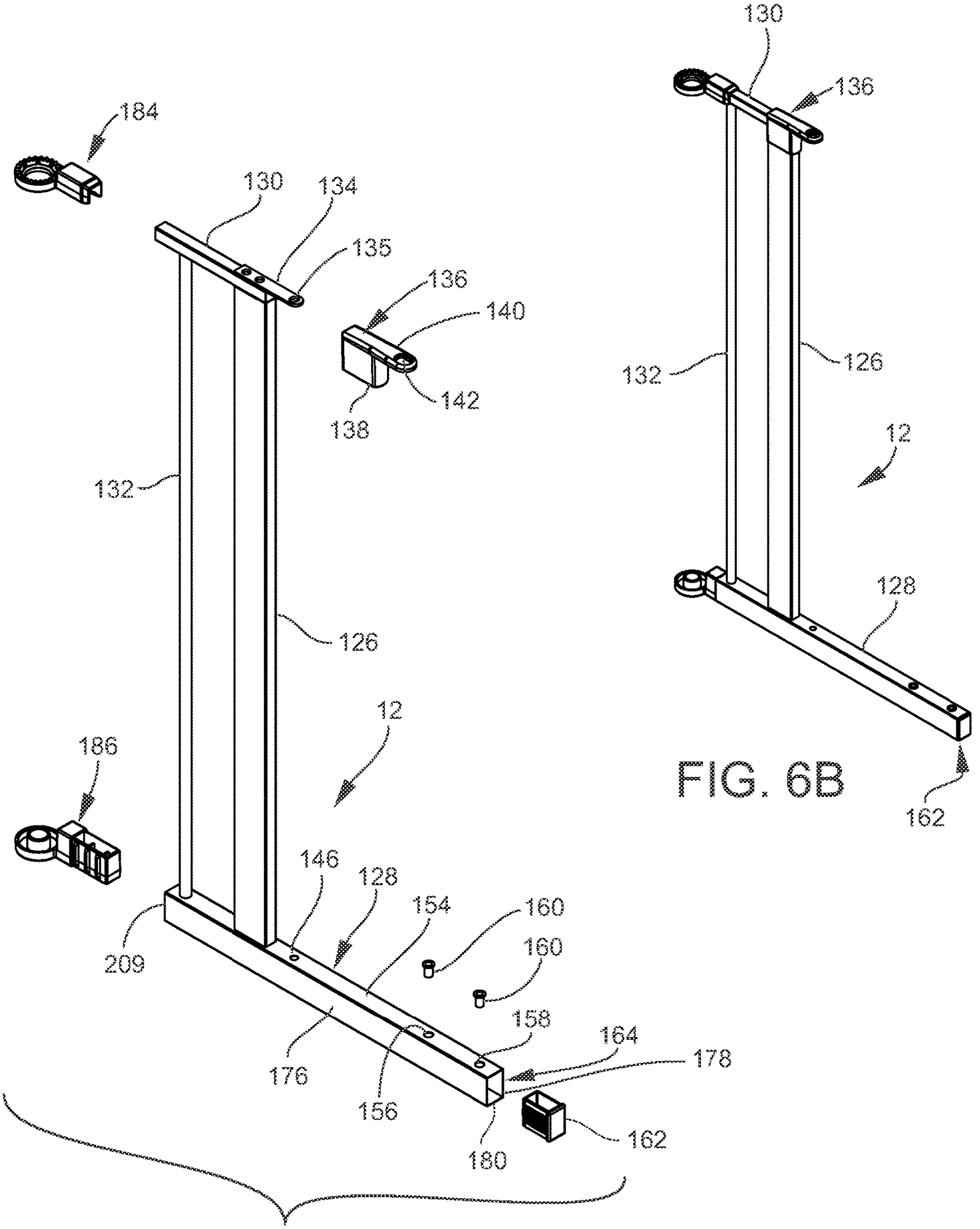
FIG. 6A is a perspective exploded view of a first portion of the barrier frame of the gated barrier of FIG. 1.
FIG. 6B is a perspective assembled view of the first portion of the barrier frame of FIG. 6A.

FIGS. 6A and 6B show the barrier frame first portion 12. Barrier frame first portion 12 includes a tubular standard 126 that is one-piece and integral with a tubular threshold portion 128. Standard 126 is rectangular in section having unequal adjacent sides. Threshold portion 128 is rectangular in section having unequal adjacent sides. Standard 126 and threshold portion 128 are disposed at a right angle relative to each other. Barrier frame first portion 12 further includes an uppermost tubular horizontal support member 130 that is one-piece and integral with standard 126. Barrier frame first portion 12 further includes a tubular cylindrical post 132 that extends between the uppermost tubular horizontal support member 130 and threshold portion 128 and that is one-piece and integral with the uppermost tubular horizontal support member 130 and threshold portion 128. Post 132 runs parallel to standard 126. Standard 126, threshold portion 128, horizontal support member 130, and post 132 define a plane. Barrier frame first portion 12 further includes a metal bar piece 134 engaged with pin connectors to the uppermost tubular horizontal support member 130 and extending inwardly in the plane of the barrier frame first portion 12. In its distal end, metal bar piece 134 includes a through hole 135. As shown in FIGS. 6A, 6B, 27A, and 27B, a plastic piece or hinge cover 136 includes a U-shaped body 138 for receiving a portion of the uppermost tubular horizontal support member 130 and a portion of the standard 126. A bar shaped upper receptor 140 is integral with the U-shaped body 138 and receives therein the metal bar piece 134. Bar shaped upper receptor 140 includes in its distal end a through hole 142 that aligns with hole 135 of bar piece 134 after assembly. Plastic piece 136 further includes an integral end cap portion 144 that is inserted into the inner open end of the uppermost tubular horizontal support member 130.

Barrier frame first portion 12 further includes a hole 146 for reception of a pin portion 148 of an end cap piece 150 that is inserted into a vertical tubular support member 152 of gate 16, as shown in FIG. 12. Hole 146 is formed in the upper side 154 of the threshold portion 128. The upper side 154 further includes two pin receptor holes 156, 158 for receiving pin connectors 160.

Figure 26A:
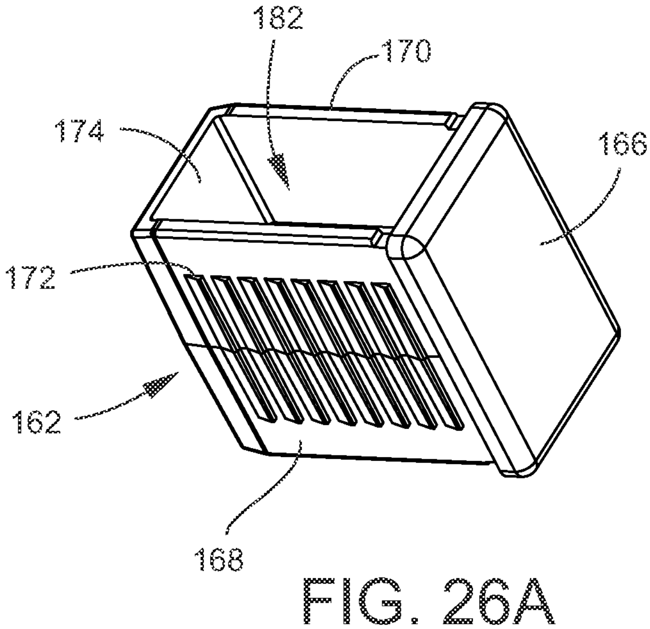
FIG. 26A is perspective view of an open ribbed end cap plug for the inside ends of the first and second threshold portions of the gated barrier of FIG. 1.

Barrier frame first portion 12 further includes an end cap 162 for insertion into and closing off the inner open end 164 of the threshold portion 128. End cap 162 is shown in FIG. 26A. A horizontal section of end cap 162 is rectangular with unequal adjacent sides. A vertical section of end cap 162 is rectangular with unequal adjacent sides. End cap 162 includes four solid sides and does not include fifth and sixth sides. In other words, fifth and sixth sides of end cap 162 are open such that end cap 162 is tubular and includes a through opening. A first side 166 of end cap 162 is the end side that is exposed to view and lies outside of the threshold portion 128. Second and third sides 168, 170 are identical to each other and include vertically extending ribs 172. A fourth side 172 is opposite of first side 166. The distance between the outer faces of sides 168, 170 is about equal to or slightly less than the distance between the inner faces of sides 176, 178 of threshold portion 128 such that end cap 162 fits into open end 164 with a friction fit. The distance between the upper and lower edges of second side 168 is about equal to or slightly less than the distance between the inner faces of upper side 154 and lower side 180 of threshold portion 128 such that end cap 162 fits into open end 164 with a friction fit. The distance between the upper and lower edges of third side 170 is about equal to or slightly less than the distance between the inner faces of upper side 154 and lower side 180 of threshold portion 128 such that end cap 162 fits into open end 164 with a friction fit. The vertical ribs 172 on the outer faces of the second and third sides 168, 170 contribute to make a greater friction fit. End cap 162 includes an open bottom and an open top such that end cap 162 includes a through opening 182 such that end cap 162 may be inserted either right side up or upside down, i.e., such that there is no incorrect way to insert the end cap 162 into the open end 164, such that pin 162 will encounter only open space and extend into through opening 182 when pin 162 is engaged with hole 158 when the connection 24 is being engaged. The first side 166 has a width greater than the width between the outer faces of second and third sides 168, 170. The first side 166 has a height greater than the height between upper and lower edges of side 168 or the height between upper and lower edges of side 170. The first side 166 has a width and height greater than the width and height of fourth side 174. The height and width of the first side 166 is about equal to the height and width of outer faces of the threshold portion 128 such that the outer four edges of first side 166 are about flush with the outer four faces of the threshold portion 128. End cap 162 can be referred to as a plug since the second, third, and fourth sides 168, 170, 174 plug into the open end 164. Vertical outermost side 174 of plug 162 in threshold portion 128 is disposed intermediate pin holes 416 and intermediate pin connectors 412. Vertical outermost side 174 of plug 162 in threshold portion 43 is disposed intermediate pin holes 418 and intermediate pin connectors 414.

Figure 23A:
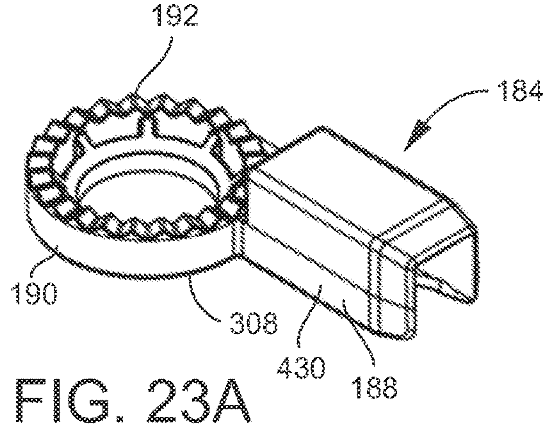
FIG. 23A is a toothed female disk end cap unit for employment in the junctions between the panels of FIG. 1.
Figure 23B:
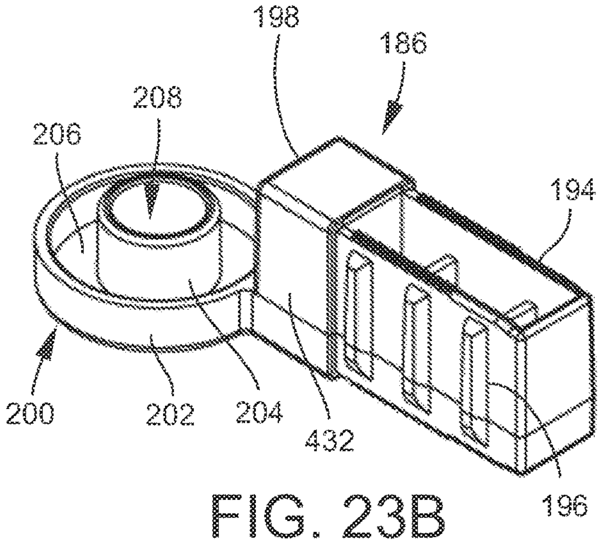
FIG. 23B is a male disk end cap plug unit for employment in the junctions between the panels of FIG. 1.

Barrier frame first portion 12 further includes two parts of the junction apparatus 20. These two parts are a toothed annulus end cap 184 or uppermost junction portion 184 and a disk end cap 186 or disk end cap plug 186 or lowermost junction portion 186. As shown in FIG. 23A, toothed annulus end cap 184 includes a support member receptor 188 that is integral with a toothed annulus 190 having a set of endless teeth 192 on top of the annulus 190. Support member receptor 188 is friction fit to uppermost support member 130 and can also be engaged by a pin extending from the bottom side of receptor 188 into the uppermost support member 130. The support member receptor 188 receives therein an outer portion of the uppermost tubular horizontal support member 130 of the barrier frame first portion 12. As shown in FIG. 23B, the disk end cap plug 186 includes a plug portion 194 with vertical ribs 196 on the vertical sides of the plug portion 194. Disk end cap plug 186 includes an end cap portion 198 that abuts against the edges of the open end of the threshold member 128. Disk end cap plug 186 includes a disk portion 200 that includes an outer cylinder 202, an inner cylinder 204, and a floor 206 that closes off outer cylinder 202 and inner cylinder 204 and that provides a flat surface for resting on a hardwood floor or a carpet or grass. Inner cylinder 204 defines a female receiver 208 for receiving inner cylinder 278 of end cap 268. When assembled, at the locations adjacent the first and second barrier frame portions 12, 14, end cap 186 engages end cap 268 and male inner cylinder 278 of end cap 268 is received in the female inner cylinder 204 of end cap 186. The plug portion 194 of the disk end cap plug 186 is plugged into the outer open end 209 of the barrier frame first portion 12 or barrier frame second portion 14.

Figure 7B:
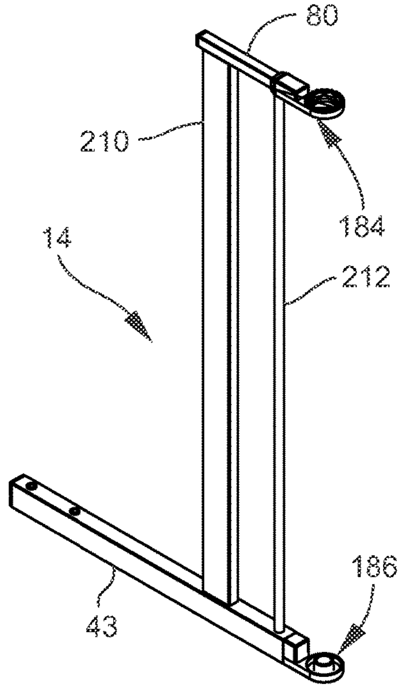
FIG. 7B is a perspective assembled view of the second portion of the barrier frame of FIG. 7A.
Figure 7A:
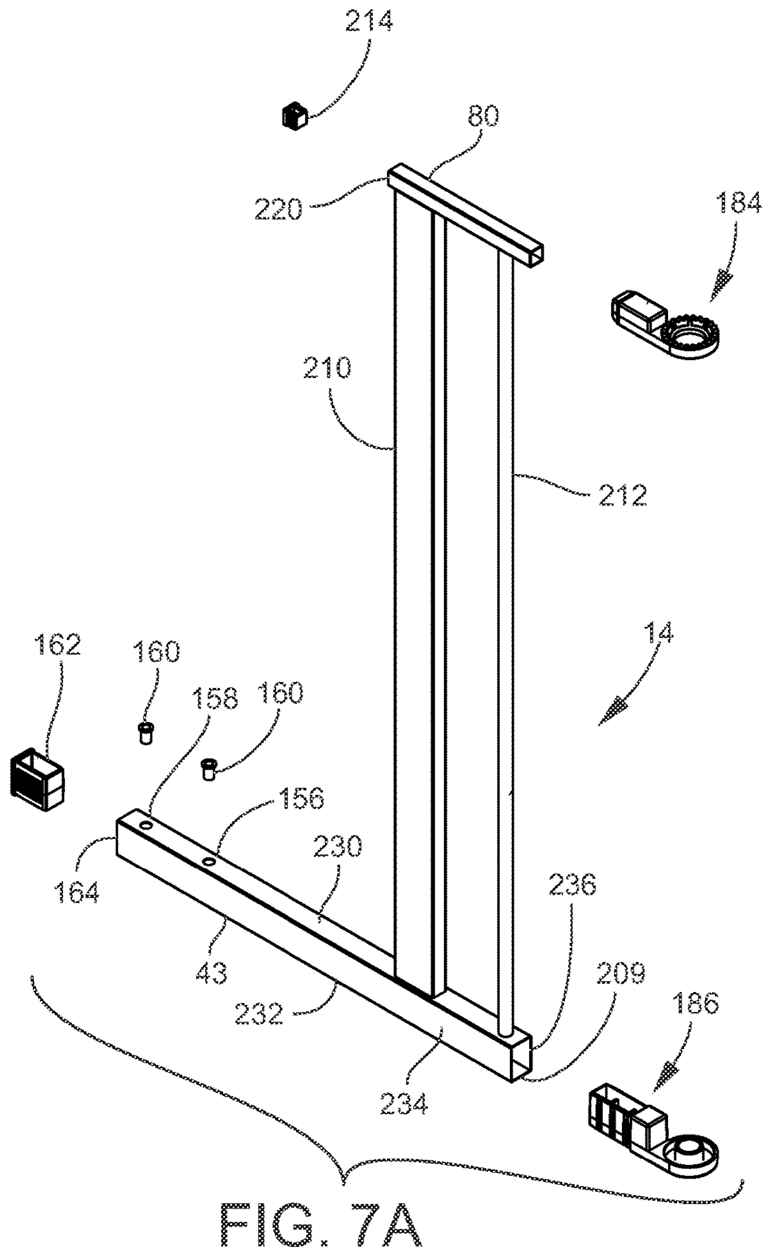
FIG. 7A is a perspective exploded view of a second portion of the barrier frame of the gated barrier of FIG. 1.
Figure 26B:
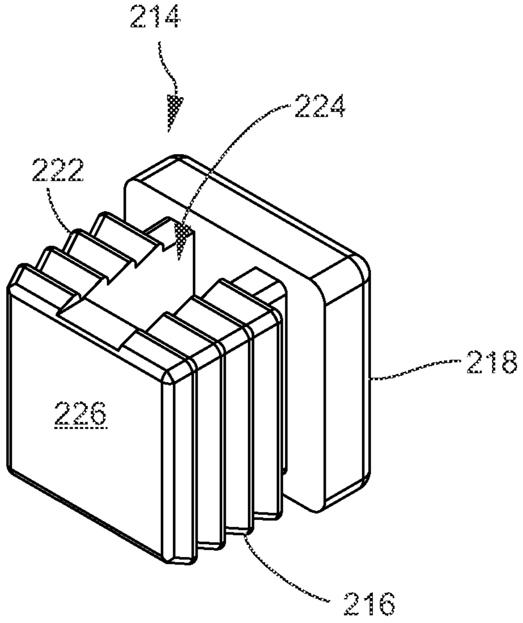
FIG. 26B is a perspective view of an open ribbed end cap plug for the latch tubular end of the uppermost support member of the gate of the gated barrier of FIG. 1.

FIGS. 7A and 7B show the barrier frame second portion 14. Barrier frame second portion 14 includes a second tubular standard 210 that is one-piece and integral with the second tubular threshold portion 43. Second standard 210 is rectangular in section having unequal adjacent sides. Second threshold portion 43 is rectangular in section having unequal adjacent sides. Second standard 210 and second threshold portion 43 are disposed at a right angle relative to each other. Barrier frame second portion 14 further includes the second uppermost tubular horizontal support member 80 that is one-piece and integral with second standard 210. Barrier frame second portion 14 further includes a second tubular cylindrical post 212 that extends between the second uppermost tubular horizontal support member 80 and second threshold portion 43 and that is one-piece and integral with the second uppermost tubular horizontal support member 80 and second threshold portion 43. Second post 212 runs parallel to second standard 210. Second standard 210, second threshold portion 43, second horizontal support member 80, and second post 212 define a plane. Barrier frame second portion 14 further includes an end cap plug 214 having a plug portion 216 integral with an end cap portion 218, as shown in FIGS. 7A and 26B. Plug portion 216 is friction fit into the open end 220 of second uppermost tubular support member 80 until end cap portion 218 abuts the four outer edges that define the open end 220. The plug portion 216 includes ribs 222 that extend from all four inner faces of the plug portion 216 that confront the four inner faces of the second uppermost tubular horizontal support member 80. End cap plug 214 includes a through opening 224 that permits the plug portion 216 to flex inwardly as the plug portion 216 is inserted into the open end 220. The through opening 224 is formed between an inner end 226 and the end cap portion 218 and two of the ribbed sides of the plug portion 216. A second end cap plug 214 is employed for plugging the open end 228 of the uppermost tubular horizontal support member 62 of the gate 16. Such first and second end cap plugs 214 have end cap portions 218 that are adjacent to and spaced apart from each other when gate 16 is in the closed position.

Barrier frame second portion 14 further includes the two pin receptor holes 156, 158 for receiving pin connectors 160. Pin receptor holes 156, 158 are formed in an upper side 230 of second threshold portion 43. Second threshold portion 43 further includes a bottom side 232 opposite of the upper side 230. Second threshold portion 43 further includes a front side 234 and a rear side 236 that is opposite of the front side 234.

Barrier frame second portion 14 further includes a second end cap 162 for insertion into and closing off the inner open end 164 of the second threshold portion 43. End cap 162 is described above as to barrier frame first portion 12 and such description is supplemented here. Second end cap 162 is shown in FIG. 26A. A horizontal section of second end cap 162 is rectangular with unequal adjacent sides. A vertical section of second end cap 162 is rectangular with unequal adjacent sides. Second end cap 162 includes four solid sides and does not include fifth and sixth sides. In other words, fifth and sixth sides of second end cap 162 are open such that end cap 162 is tubular. A first side 166 of second end cap 162 is the end side that is exposed to view and lies outside of the threshold portion 43. Second and third sides 168, 170 are identical to each other and include vertically extending ribs 172. A fourth side 172 is opposite of first side 166. The distance between the outer faces of sides 168, 170 is about equal to or slightly less than the distance between the inner faces of sides 234, 236 of threshold portion 43 such that second end cap 162 fits into open end 164 of second threshold portion 43 with a friction fit. The distance between the upper and lower edges of second side 168 is about equal to or slightly less than the distance between the inner faces of upper side 230 and lower side 232 of second threshold portion 43 such that second end cap 162 fits into open end 164 of second threshold portion 43 with a friction fit. The distance between the upper and lower edges of third side 170 is about equal to or slightly less than the distance between the inner faces of upper side 230 and lower side 232 of second threshold portion 43 such that second end cap 162 fits into open end 164 of second threshold portion 43 with a friction fit. The vertical ribs 172 on the outer faces of the second and third sides 168, 170 contribute to make a greater friction fit with the open end 164 of second threshold portion 43. End cap 162 includes an open bottom and an open top such that end cap 162 includes a through opening 182 such that end cap 162 may be inserted either right side up or upside down, i.e., such that there is no incorrect way to insert the end cap 162 into the open end 164 of second threshold portion 43, such that pin 162 will encounter only open space when pin 162 is engaged with hole 158 of second threshold portion 43 when the connection 24 is being engaged between first and second threshold portions 128 and 43. The first side 166 of the second end cap 162 has a width greater than the width between the outer faces of second and third sides 168, 170. The first side 166 of the second end cap 162 has a height greater than the height between upper and lower edges of side 168 or the height between upper and lower edges of side 170. The first side 166 of the second end cap 162 has a width and height greater than the width and height of fourth side 174. The height and width of the first side 166 of the second end cap 162 is about equal to the height and width of outer faces of the second threshold portion 43 such that the outer four edges of first side 166 of second end cap 162 are about flush with the outer four faces of the second threshold portion 43. Second end cap 162 can be referred to as a plug since the second, third, and fourth sides 168, 170, 174 plug into the open end 164 of the second threshold portion 43.

The connection 24 is disposed between pin portion 148 and the third lock 26. In other words, the connection 24 is disposed on the threshold first and second portions 128, 43 between 1) a location on threshold first portion 128 where the axis on which gate 16 swings intersects the threshold first portion 128 and 2) a location where the gate 16, through third lock 26, engages the second threshold portion 43. The connection 24 preferably maintains the first and second end caps 162 in an adjacent and spaced apart relation. However, if desired, the first and second end caps 162 may abut each other.

The gate 16 includes lowermost traversing member 38, uppermost traversing member 62, first end member 152 adjacent to the first standard 126 of the barrier frame first portion 12, a second end member 40 adjacent to the second standard 210 of the barrier frame second portion 14, and a set of internal vertical support members 372. The first and second end members 152, 40 and the set of internal vertical support members 372 space the lowermost and uppermost traversing members 38, 62 apart from each other. One of the internal vertical support members 372 is disposed on a straight line that intersects the rigid elongate straight piece 410 and the threshold first portion 128. Another of the internal vertical support members 372 is disposed on a straight line that intersects the rigid elongate straight piece 410 and the threshold second portion 43.

Barrier frame second portion 14 further includes two parts of the junction apparatus 20. These two parts are the toothed annulus end cap 184 and the disk end cap plug 186, both of which are described above as to the barrier frame first portion 12. The support member receptor 188 of the second toothed annulus end cap 182 receives therein an outer portion of the uppermost tubular horizontal support member 80 of the barrier frame second portion 14. The plug portion 194 of the second disk end cap plug 186 is plugged into the outer open end 209 of the second threshold portion 14.

Figure 8:
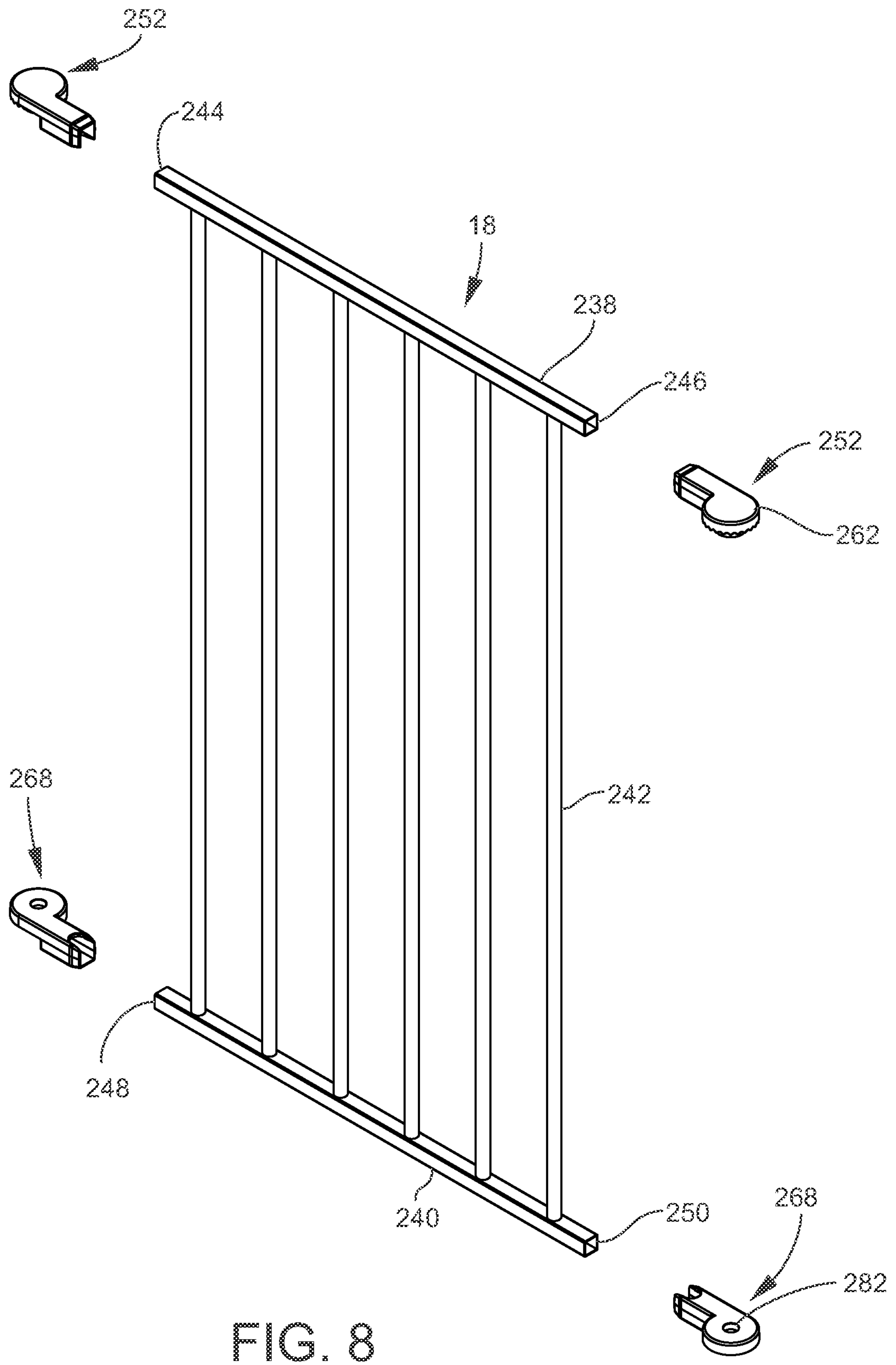
FIG. 8 is a perspective exploded view of a first panel of the gated barrier of FIG. 1.
Figure 9:
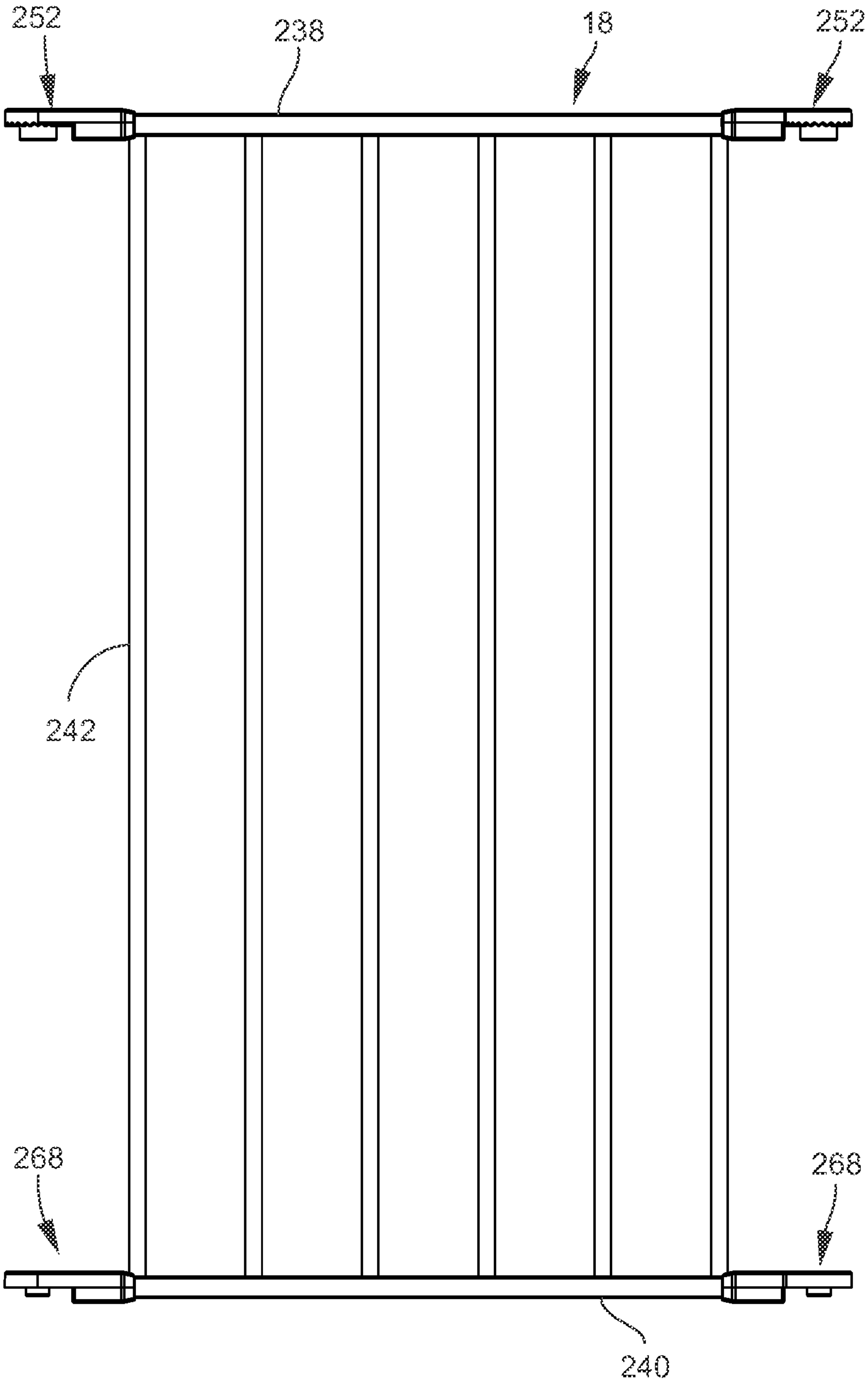
FIG. 9 is an elevation assembled view of the first panel of FIG. 8 showing the offset between bottom face of the lowermost horizontal support member of the panel and the bottom faces of the lowermost junction portions.
Figure 10:
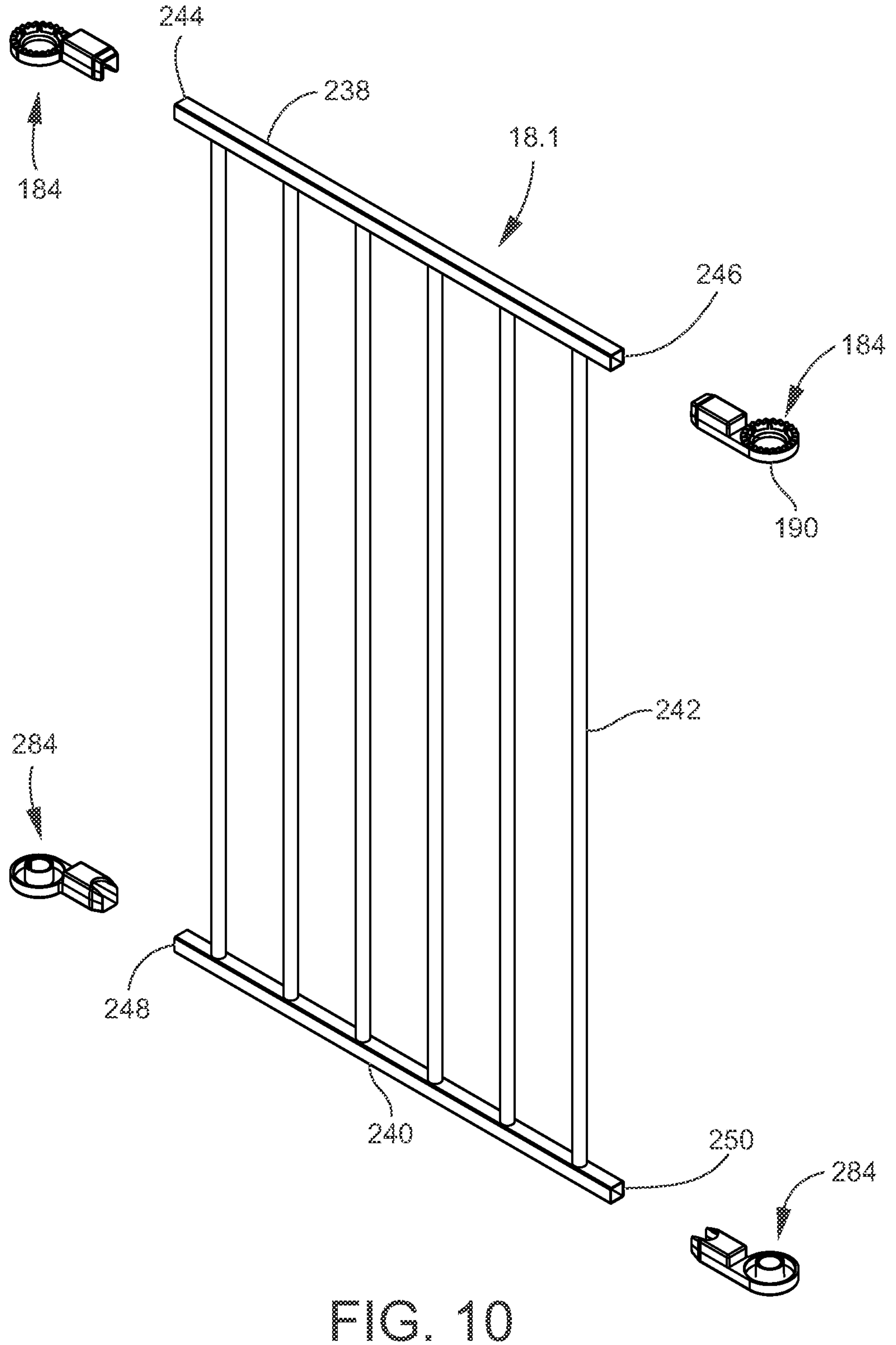
FIG. 10 is a perspective exploded view of a second panel of the gated barrier of FIG. 1.
Figure 11:
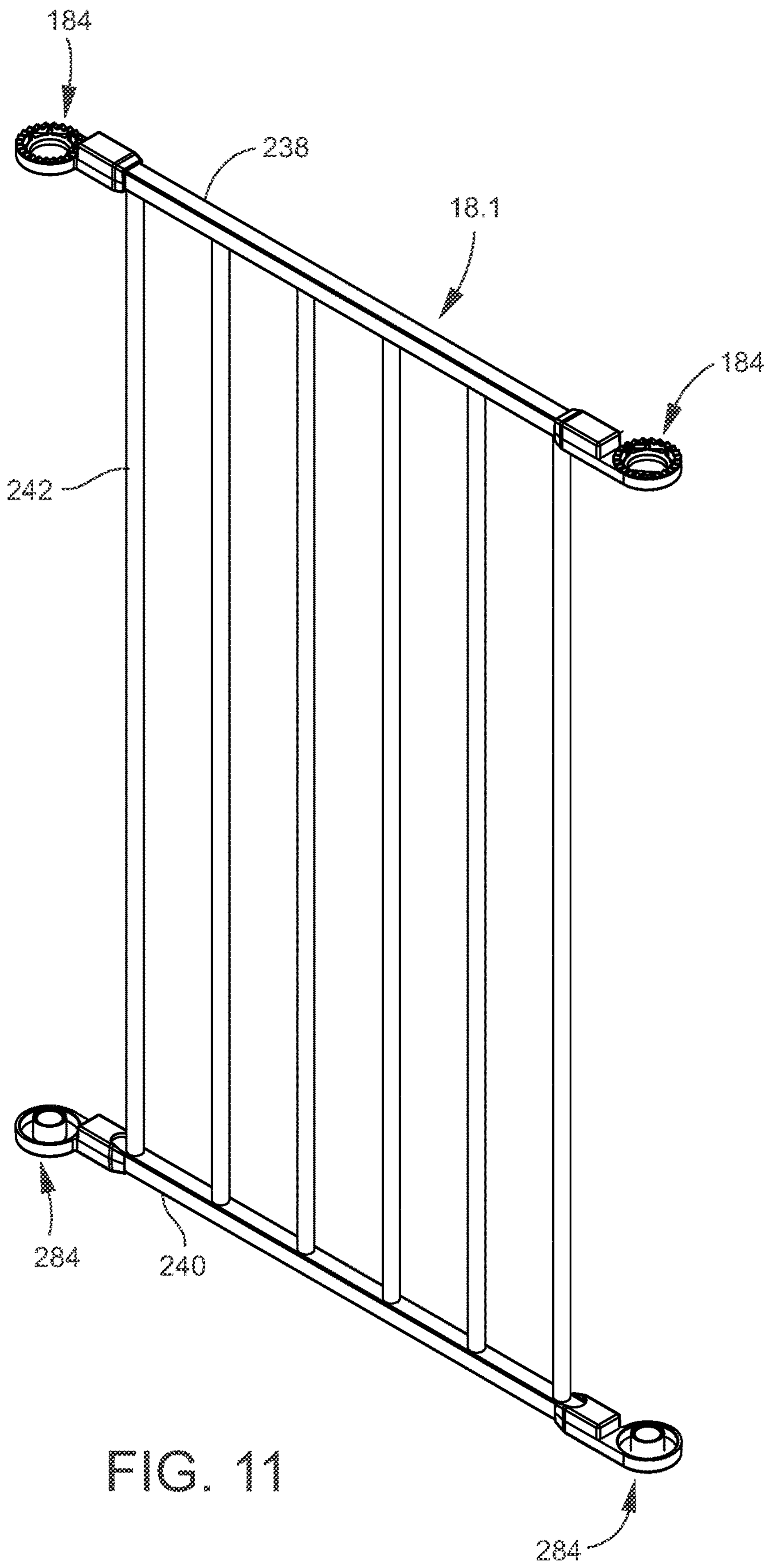
FIG. 11 is a perspective assembled view of the second panel of FIG. 10.

Panel 18 is shown in FIGS. 8 and 9, and panel 18.1 is shown in FIGS. 10 and 11. Panel 18 defines a plane. Panel 18 includes an uppermost tubular horizontal or traversing support member 238, a lowermost horizontal or traversing support member 240, and a set of vertically extending tubular support members 242 extending to and between the uppermost and lowermost support members 238, 240. Uppermost support member 238 is square in section. Lowermost support member 240 is square in section. Each of the vertical support members 242 is cylindrical. Uppermost support member 238 includes a pair of open ends 244, 246. Lowermost support member 249 includes a pair of open ends 248, 250. The endmost vertical support members 242 are set inwardly from and spaced from the open ends 244, 246, 248, 250. Vertical support members 242 are set at a right angle relative to uppermost and lowermost support members 238, 240.

Figure 23C:
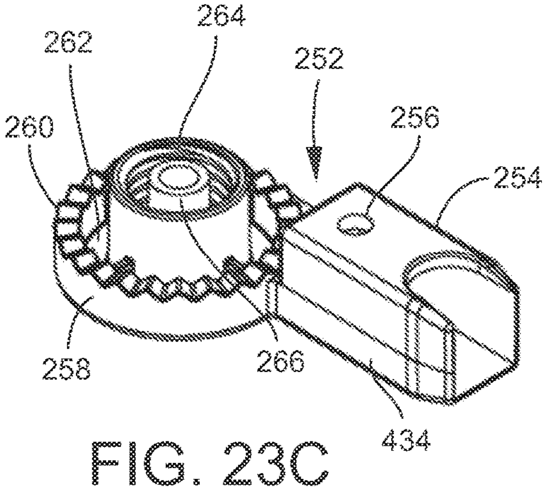
FIG. 23C is a toothed male disk end cap unit for employment in the junctions between the panels of FIG. 1.

Panel 18 in FIG. 8 includes a pair of upper end caps 252 or uppermost junction portions 252 where one end cap 252 is engaged to open end 244 and another end cap 252 is engaged to open end 246. End cap 252 is shown in FIG. 23C. End cap 252 includes a support member receptor portion 254 that is engaged by one or more of a friction fit and pin connector to uppermost support member 238. Hole 256 engages a pin that also engages uppermost support member 238. End cap 252 further includes a toothed annulus or outer cylinder 258 having a set of endless teeth 260 and floor 262 shaped in the form of a disk. Mounted on the floor 262 is an intermediate cylinder 264 and an innermost cylinder 266. Intermediate cylinder 264 is threaded on its inside cylindrical face to engage the threads of the turning knob 298. Innermost cylinder 266 is received by the through hole 306 of the turning knob 298.

Figure 23D:
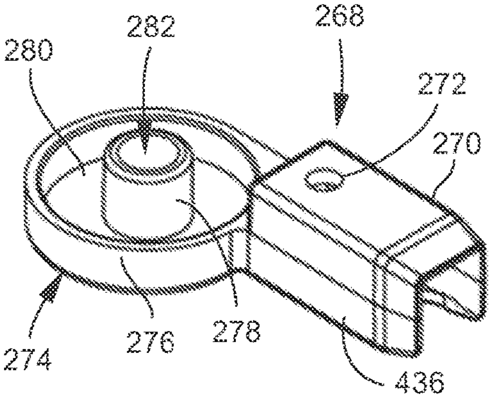
FIG. 23D is a male disk end cap unit for employment in the junctions of FIG. 1.

Panel 18 in FIG. 8 includes a pair of lower end caps 268 or lowermost junction portions 268 where one end cap 268 is engaged to open end 248 and another end cap 268 is engaged to open end 250. End cap 268 is shown in FIG. 23D. End cap 268 includes a support member receptor portion 270 that is engaged by one or more of a friction fit and pin connector to lowermost support member 240. Hole 272 engages a pin that also engages lowermost support member 240. End cap 268 includes a disk portion 274 that includes an outer cylinder 276 and an inner cylinder 278. The inner cylinder 278 defines a post receptor. End cap 268 includes ceiling 280 that closes off the upper end of the outer cylinder 276 but leaves open inner cylinder 278 such that inner cylinder 278 acts as the post receptor. Inner cylinder 278 is not a through hole. Inner cylinder 278 includes an intermediate floor 282 disposed about halfway between the ends of inner cylinder 278. It is this intermediate floor 282 upon which rests the bottom end of tubular post support member 30 of junction apparatus 20. The inner cylinder 278 is also shown in FIG. 8.

FIG. 9 shows the panel 18 of FIG. 8 with the upper and lower end caps 252, 268 engaged. FIG. 9 is an elevation view.

FIG. 10 shows panel 18.1 with upper end cap 184. Upper end cap 184 is shown in FIG. 23A. A first upper end cap 184 is engaged to open end 244 of uppermost horizontal support member 238. A second upper end cap 184 is engaged to open end 246 of uppermost horizontal support member 238. End caps 184 may be one or more of friction fit and engaged with a pin connector to the uppermost horizontal support member 238.

Figure 23E:
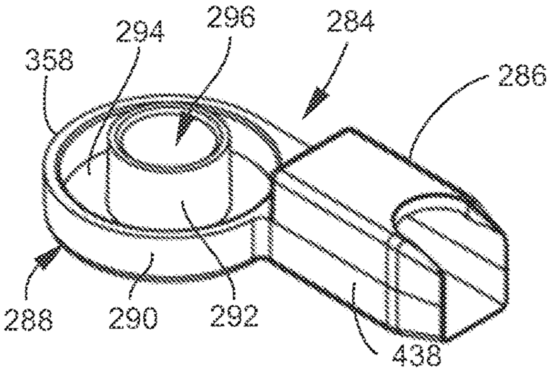
FIG. 23E is a female disk end cap unit for employment in the junctions of FIG. 1.

FIG. 10 shows panel 18.1 with first lower end cap 284 or lowermost junction portion 284 engagable on open end 248 and a second lower end cap 284 or lowermost junction portion 284 engagable on open end 250. End cap 284 is shown in FIG. 23E. End cap 284 includes a support member receptor portion 286 that is engaged by one or more of a friction fit and pin connector to lowermost support member 240. End cap 284 includes a disk portion 288 that includes an outer cylinder 290, an inner cylinder 292, a floor 294 that closes off the bottom ends of the cylinders 290, 292, and a cylinder receptor 296 that is defined by the inner cylinder 292. Receptor 296 terminates at floor 294. End cap 284 is a female receptor as female cylinder receptor 296 receives, for example, the male inner cylinder 278 of end cap 268.

FIG. 11 shows the panel 18.1 of FIG. 10 with the upper and lower end caps 252, 268 engaged. FIG. 9 is an elevation view.

Lower end caps 268 and 284 are toothless. Upper end caps 184 and 252 have teeth.

Lower end cap 268 of FIG. 8 engages lower end cap 284 of FIG. 10. The circular free edges of the outer cylinders 276, 290 abut each other. Inner cylinder 278 of end cap 268 is received in receptor 296 of inner cylinder 292 of end cap 284. Disk portion 274 of end cap 268 is disposed on top of disk portion 288 of end cap 284.

Upper end cap 252 of FIG. 8 engages upper end cap 184 of FIG. 10. Teeth 260 of end cap 252 engage the teeth 192 of end cap 184. Outer cylinder 264 of end cap 252 extends downwardly through the opening of annulus 190 such that teeth 260 are on top of teeth 192.

Teeth 192 are pushed up into engagement with teeth 260 by a turning knob 298 shown in FIG. 22B. Turning knob 298 includes a roughened elongate handle 300, a push annulus 302, a threaded cylinder 304, and a through hole 306. Through hole 306 extends through the turning knob 298 from the threaded cylinder 304 to the bottom of the handle 300. Hole 306 receives the tubular post support member 30. Threaded cylinder 304 engages the inner threads of outer cylinder 264 of end cap 252 while the push annulus 302 pushes against the annular bottom 308 of annulus 190 of end cap 184.

With reference to FIG. 1, it can be noted that junction apparatus 20 may include, in sequence though some parts overlap, from top to bottom, end cap 252, end cap 184, turning knob 298, end cap 268, and end cap 284. With reference to FIG. 1, one way to assemble this junction apparatus 20 is to push the tubular post support member 30 up through the turning knob 298 such that the turning knob 298 is intermediate the upper and lower ends of the tubular post support member 30, place the end cap 252 on top of end cap 184 such that teeth 192 and 260 are brought together, turn the turning knob 298 to mesh and tighten with end cap 252, slip end cap 268 between the bottom of tubular post support member 30 and end cap 284, place inner cylinder 278 of end cap 268 into the inner cylinder 292, then place the bottom of the tubular post support member 30 into post receptor 282 of end cap 268, and then further tighten the turning knob 298 against end cap 252. This relates to junction apparatus 20 between panel 18 and panel 18.1.

With reference to FIG. 1, the junction apparatus 20 between barrier frame first portion 12 and panel 18 includes, in sequence from top to bottom with some overlap, the end cap 252, the end cap 184, the turning knob 298, the tubular post support member 30, the end cap 268, and the end cap 186. One way to assemble this junction apparatus 20 is to push the tubular post support member 30 up through the turning knob 298, place the end cap 252 on top of end cap 184 such that teeth 192 and 260 are brought together, turn the turning knob 298 to mesh and tighten with end cap 252, slip end cap 268 between the bottom of tubular post support member 30 and end cap 186, place inner cylinder 278 of end cap 268 into the inner cylinder 204 of end cap 186, then place the bottom of the tubular post support member 30 into post receptor 282 of end cap 268, and then further tighten the turning knob 298 against end cap 252.

FIG. 3 shows an end junction apparatus 310 and an end junction apparatus 312. End junction apparatus 310 includes, from top to bottom with some overlap, a toothed end cap 314 or uppermost junction portion 314, end cap 184, tubular post support member 30, turning knob 298, an upper wall mount 28, a lower wall mount 28, a male cap 316 or lowermost junction portion 316, and end cap 284. End junction apparatus 312 includes, from top to bottom with some overlap, end cap 252, toothed annulus 318 or uppermost junction portion 318, turning knob 298, upper wall mount 28, tubular post support member 30, lower wall mount 28, end cap 268, and female cap 320 or lowermost junction portion 320.

Toothed end cap 314 is shown in FIG. 22C. Toothed end cap 314 includes an outer cylinder 322 with a set of teeth 324 depending from a lower annular edge of the outer cylinder 322. Outer cylinder 322 is spaced from an intermediate cylinder 326 having an inner threaded face 328. Inwardly of and spaced from the intermediate cylinder 326 is an innermost cylinder 330 that is received in the turning knob opening 306 as the turning knob 298 threadingly engages the inner threaded face 328. Toothed end cap 314 includes a flat top.

Figure 26C:
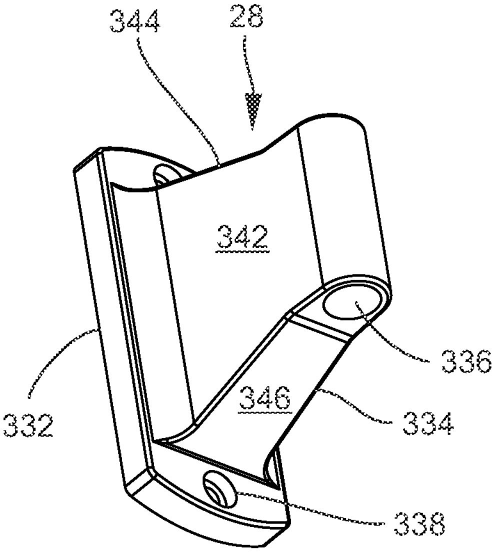
FIG. 26C is a perspective view of hardware that may be mounted on a wall for engagement to an end junction of FIG. 3.
Figure 27A:
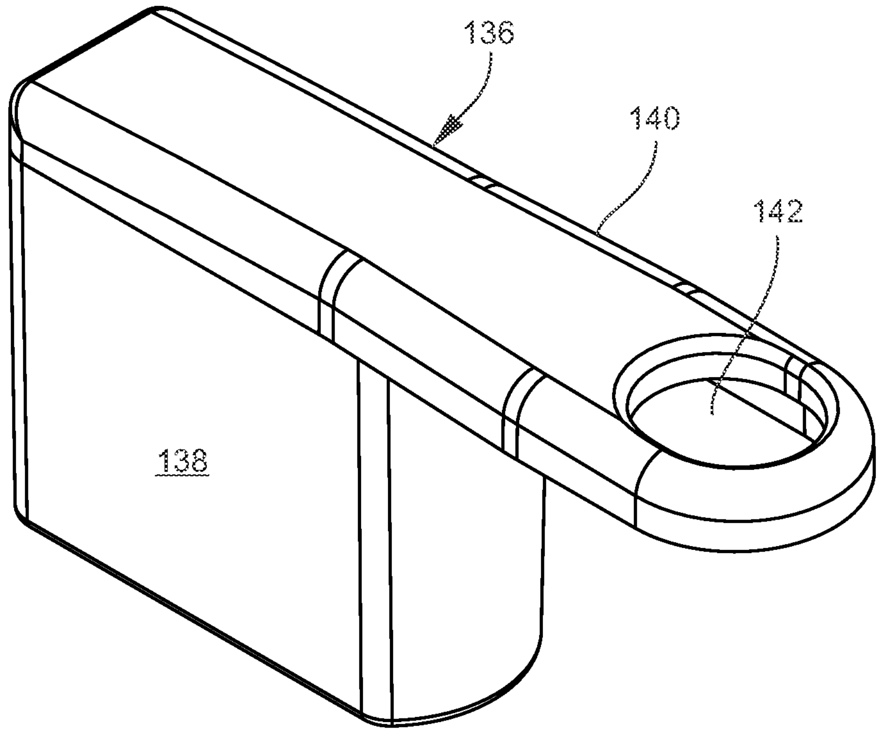
FIG. 27A is a perspective view of a hinge cover for the barrier frame first portion of the gated barrier of FIG. 1.
Figure 27B:
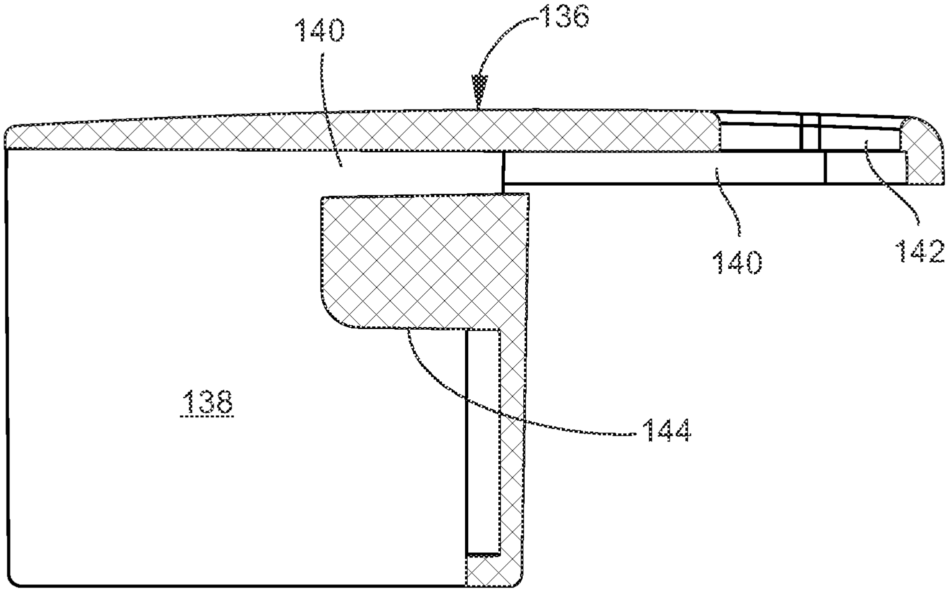
FIG. 27B is a section view of the hinge cover of FIG. 27A.

Wall mount 28 is shown in FIG. 26C. Wall mount 28 includes a base portion 332, an extended body 334 integral with and extending from the base portion 332, and a vertical through opening 336 at the distal end of the extended body 334. Through opening 336 pivotally receives tubular post support member 30. Base portion 332 includes upper and lower pin connector holes 338 for reception of pin connectors 340 that engage a vertical surface such as a wall. Extended body 334 includes side faces 342 that taper toward each other to the distal end having the vertical through hole 336. Extended body 334 includes upper and lower faces 344, 346 that taper toward each other to the distal end having the vertical through hole 336.

Figure 24A:
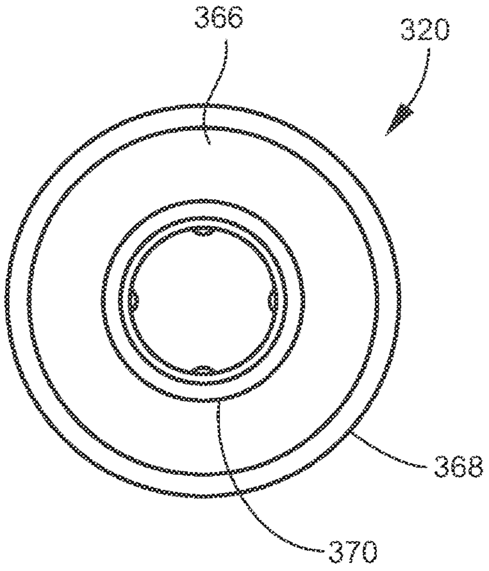
FIG. 24A is a top view of a female end cap for employment in an end and lowermost junction shown in FIG. 3.
Figure 24B:
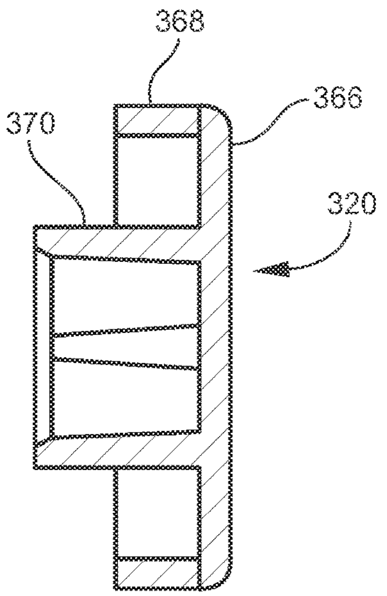
FIG. 24B is a section view of the female end cap of FIG. 24A.
Figure 24C:
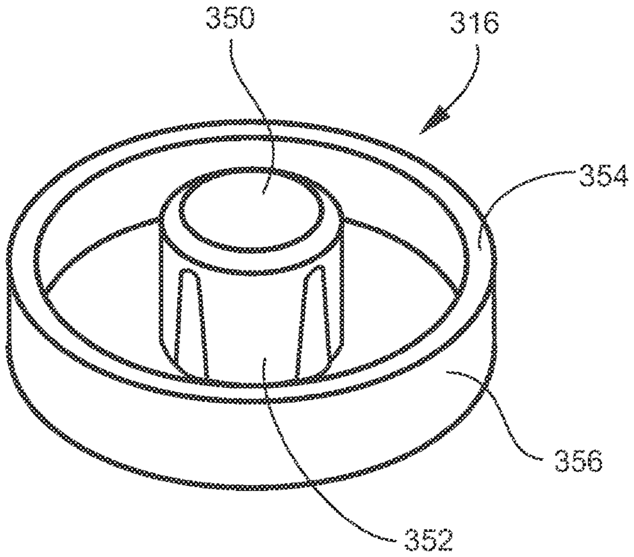
FIG. 24C is a perspective bottom view of a male end cap for employment in an end and lowermost junction of FIG. 3.
Figure 24D:
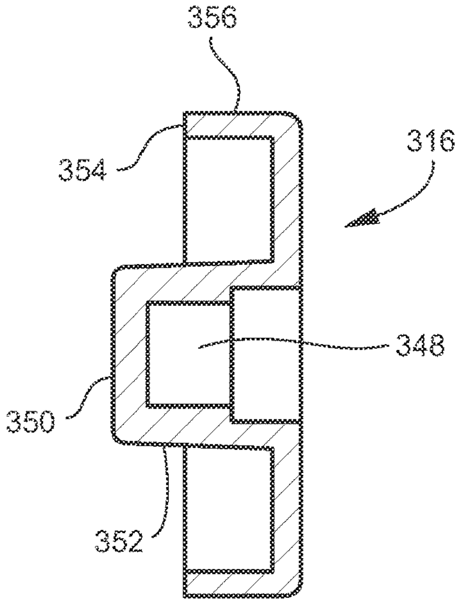
FIG. 24D is a section view of the male end cap of FIG. 24C.

Male cap 316 is shown in FIGS. 24C and 24D. First, it should be noted that the bottom of tubular post support member 30 is received in the opening 348 having floor 350 and that the bottom of tubular post support member 30 rests on the inner face of floor 350. Male conical portion 352 of male cap 316 is frictionally received in female inner cylinder 292 of female end cap 284. Bottom annular edge 354 of outer cylinder 356 of male cap 316 rests on the upper annular edge 358, shown in FIG. 23E, of outer cylinder 290 of end cap 284.

Toothed annulus 318 includes a ring portion 360 with a set of upwardly extending teeth 362. Upwardly extending teeth 362 of annulus 318 engage downwardly extending teeth 260 of end cap 252. Annular floor 364 of annulus 318 is pushed up against end cap 252 by the push annulus 302 of turning knob 298.

Female end cap 320 is shown in FIGS. 24A and 24B. Female end cap 320 includes a disk shaped floor 366, an outer cylindrical wall 368, and an inner cylindrical wall 370. The inner cylindrical wall 370 is a female receptor for the male inner cylinder 278 of end cap 268.

To assemble end junction apparatus 310, it may first be determined where wall mounts 28 will be engaged to a wall or other surface. Then the wall mounts 28 and turning knob 298 can be slid onto the tubular post support member 30. Then cap 316 can be friction fit onto end cap 284 and the bottom of tubular post support member 30 can be pushed into opening 348 to rest upon the inside face of floor 350. Then the upper end of the tubular post support member 30 can be inserted up through annulus 190 of end cap 184 and be received by the inner opening defined by the innermost cylinder 330. Then the turning knob 298 can be pushed up and engaged with inner threaded face 328 such that teeth 192 of end cap 184 can engage teeth 324 of toothed cap 314. Then turning knob 298 can be tightened. Then wall mounts 28 can be secured to the wall or other surface. It should be noted that tubular post support member 30 is pivotable relative to wall mounts 28 such that panel 18.1 having caps 314 and 316 is pivotable relative to such wall mounts 28 and to such wall or other surface.

To assemble end junction apparatus 312, it may first be determined where wall mounts 28 will be engaged to a wall or other surface. Then the wall mounts 28 and turning knob 298 can be slid onto the tubular post support member 30. Then end cap 268 can be friction fit onto cap 320 and the bottom of tubular post support member 30 can be pushed into inner cylinder 278 to rest upon the inside face of floor 282. Then the upper end of the tubular post support member 30 can be inserted up through toothed annulus 318 and be received by the inner opening defined by the innermost cylinder 266. Then the turning knob 298 can be pushed up and engaged with inner threaded face of intermediate cylinder 264 such that teeth 260 of end cap 252 can engage teeth 362 of toothed annulus 318. Then turning knob 298 can be tightened. Then wall mounts 28 can be secured to the wall or other surface. It should be noted that tubular post support member 30 is pivotable relative to wall mounts 28 such that panel 18 having toothed annulus 318 and cap 320 is pivotable relative to such wall mounts 28 and to such wall or other surface.

Figure 25A:
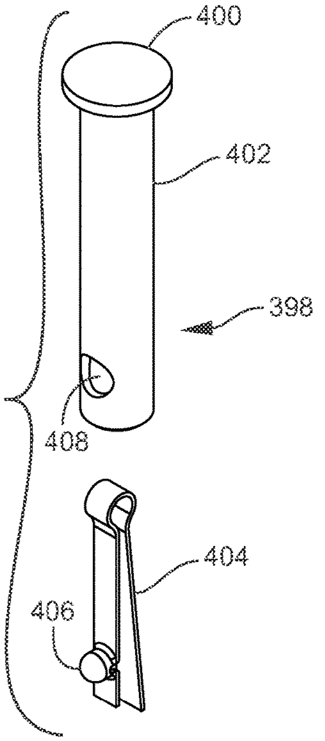
FIG. 25A is an exploded view of the hinge pin for the gate of the gated barrier of FIG. 1.
Figure 25C:
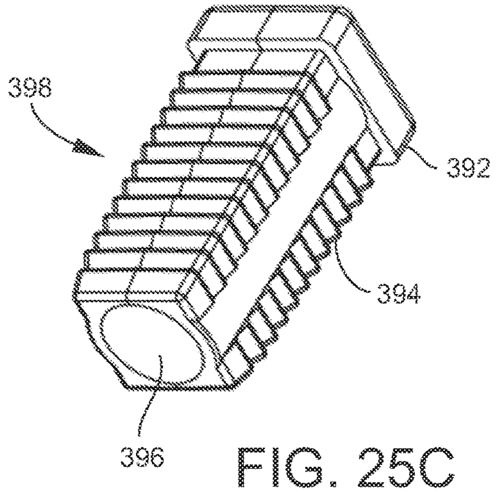
FIG. 25C is a perspective view of the hinge pin receiving ribbed end cap plug of FIG. 25B.
Figure 25B:
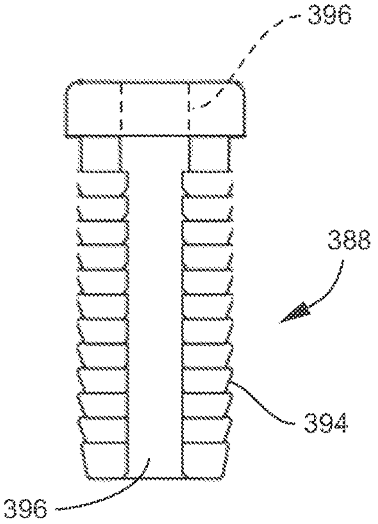
FIG. 25B is a side view of a hinge pin receiving ribbed end cap plug for the upper pivoting end of the gate of the gated barrier of FIG. 1.
Figure 25D:
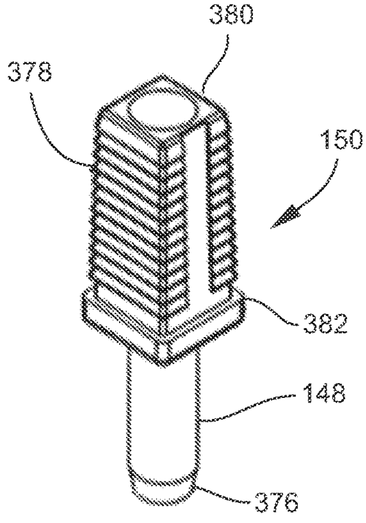
FIG. 25D is a perspective view of a ribbed end cap plug with pin for the bottom pivoting end of the gate of the gated barrier of FIG. 1.

Gate 16 is shown in FIGS. 1, 2, 3, 12, 13, and 14. As described above, gate 16 includes the lowermost horizontal or traversing support member 38, the vertical or end support member 40, the uppermost horizontal or traversing support member 62, and the vertical or end support member 152. Gate 16 further includes a set of interior vertical or upright support members 372 extending to and between the lower horizontal support member 38 and the uppermost horizontal support member 62. Perimeter support members 38, 40, 62, and 152, are tubular. Interior support members 372 are tubular. Perimeter support members 38 are square in section. Interior support members 372 are cylindrical. End support member 152 includes an open bottom end 374 for the reception of end cap piece 150 having pin portion 148, shown in FIGS. 12 and 25D. Pin portion 148 includes a bottom end 376 that is frustoconically tapered to guide the pin portion 148 into hole 146 of the threshold 128 of barrier frame first portion 12. End cap piece 150 includes a plug portion 378 having four ribbed sides that taper inwardly toward a top end 380. Between the plug portion 378 and pin portion 148 is a four sided stop 382 that abuts the absolute bottom edges of the end vertical support member 152 to prevent the end cap 150 from being further inserted into the open end 374. Gate 16 further includes the latch apparatus 22 described above that is engaged adjacent to the junction of uppermost horizontal support member 62 and end vertical support member 40. Gate 16 further includes end cap plug 214 shown in FIGS. 12 and 26B that is engaged in otherwise open end 228 of uppermost horizontal support member 62. Gate 16 further includes the third lock apparatus 26 that is engaged where the bottom end 384 of end support member 40 is adjacent to and spaced from the open end 386 of the lowermost horizontal support member 38. Gate 16 further includes a pin receiving piece 388 that is engaged in a top open end 390 of end vertical support member 152. Pin receiving piece 388 includes a stop portion 392 and a four sided ribbed plug portion 394. Stop portion 392 abuts the four uppermost edges of end vertical support member 152 to prevent the pin receiving piece 388 from sinking downwardly beyond the open end 390 of end vertical support member 152. Stop portion 392 and plug portion 394 share an axial through opening 396 that receives a pivot pin 398 that is shown in FIGS. 1 and 25A. Pivot pin 396 includes a head 400 having a diameter greater than the diameter of through opening 396 and greater than the diameter of opening 142 of plastic piece 136, which engages the pivot pin 396 immediately above the stop portion 392 of pin receiving piece 388. Pivot pin 398 includes a tubular shaft 402 that receives a spring 404 therein. Spring 404 includes a button 406 that extends through a hole 408 in a bottom portion of shaft 402. In assembly, the button 406 is depressed immediately prior to the pivot pin 398 being inserted through openings 142 and 396. While being inserted, the button 406 remains depressed by the inner cylindrical side of opening 396. The button 406 resiliently snaps out of hole 408 when the button 406 exits the bottom of opening 396 such that the pivot pin 398 is locked to pin receiving piece 388. Pivot pin 398 has a length greater than the height of the pin receiving piece 388. Gate 16 swings on pivot pin 398 and pin portion 148 that are axially aligned.

Figure 16A:
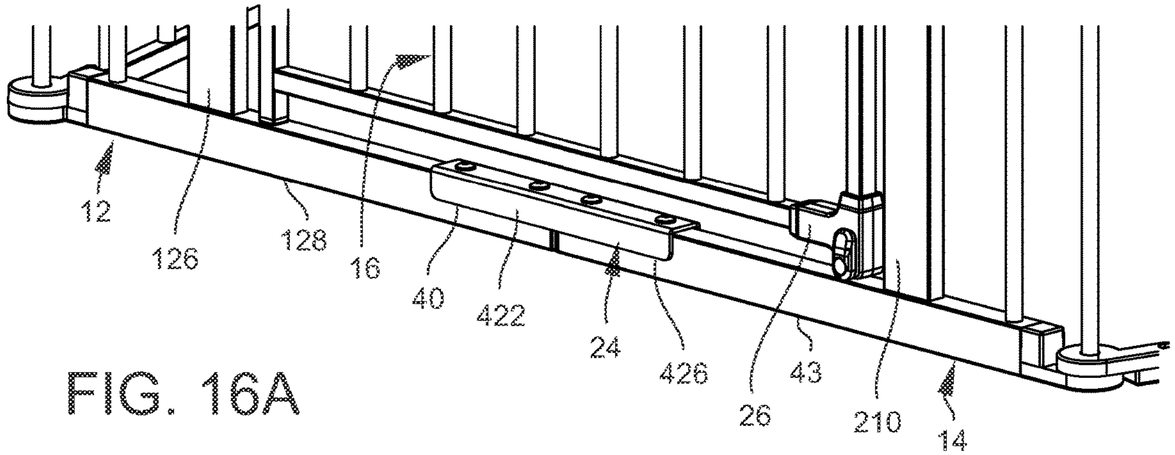
FIG. 16A is a perspective view of a portion of the gated barrier of FIG. 2 that shows the threshold connection.
Figure 16B:
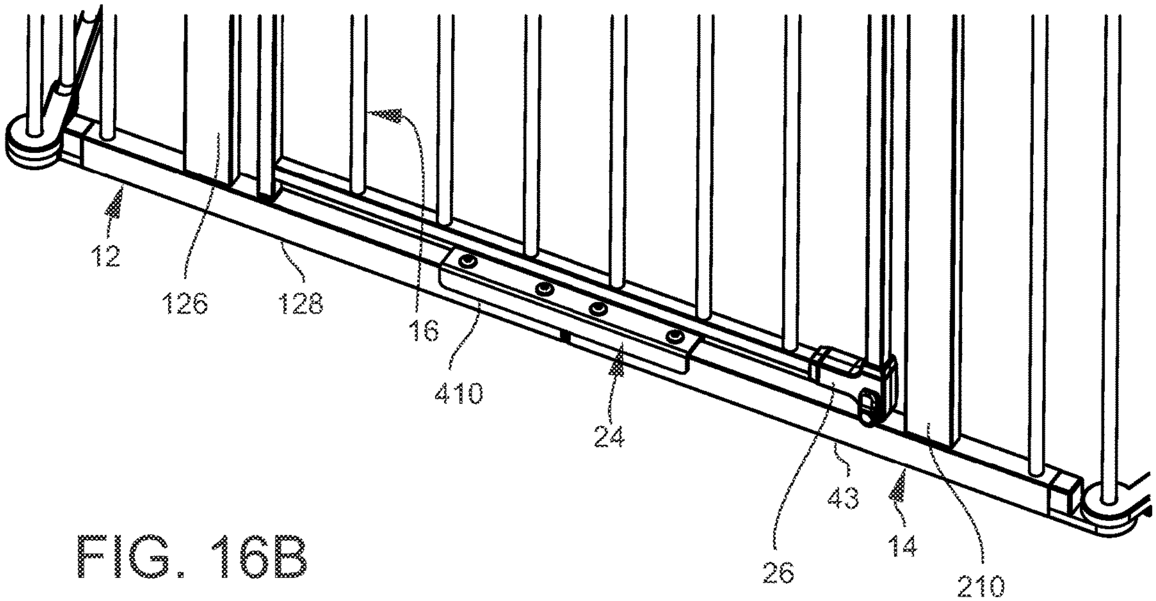
FIG. 16B is a perspective view of a portion of the gated barrier of FIG. 2 taken from a different perspective than FIG. 16A.
Figure 17A:
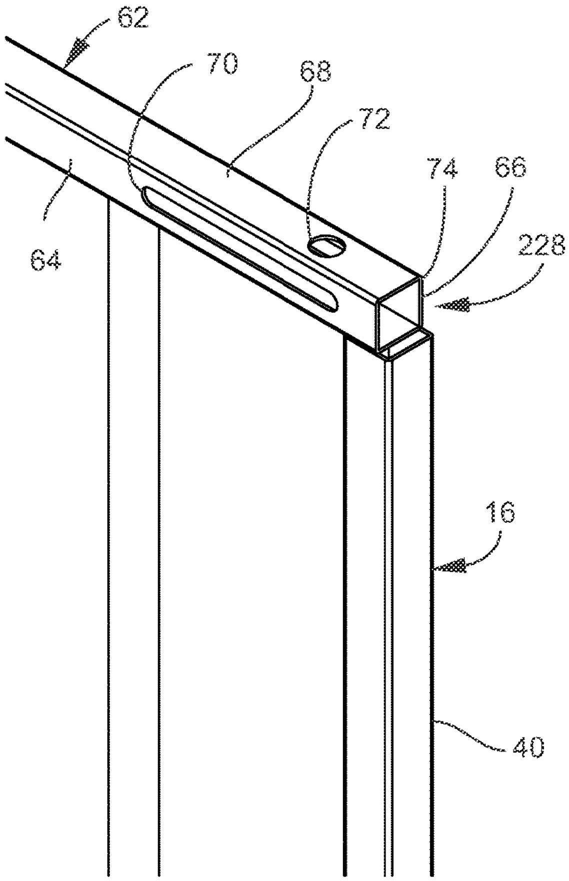
FIG. 17A is a perspective detail view of a corner of the stripped down gate of FIG. 14.
Figure 17B:
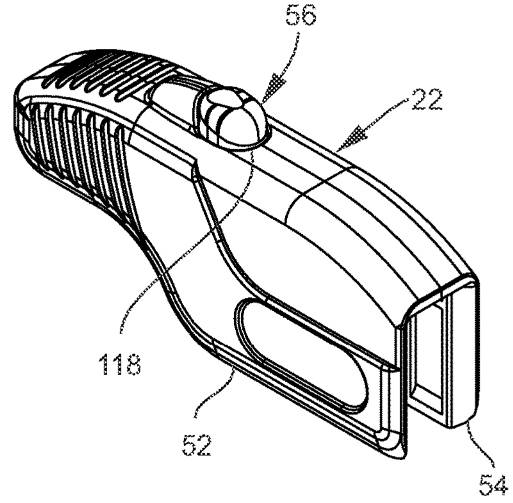
FIG. 17B is a perspective assembled view of the locking handle apparatus or latch apparatus of FIG. 5.
Figure 17C:
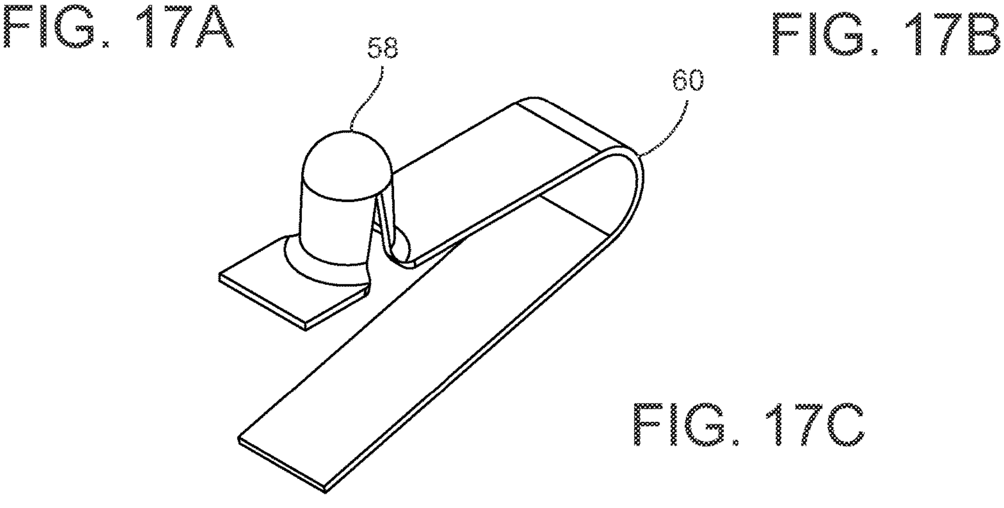
FIG. 17C is a perspective view of the push button spring of the latch apparatus of FIG. 17B.
Figure 18A:
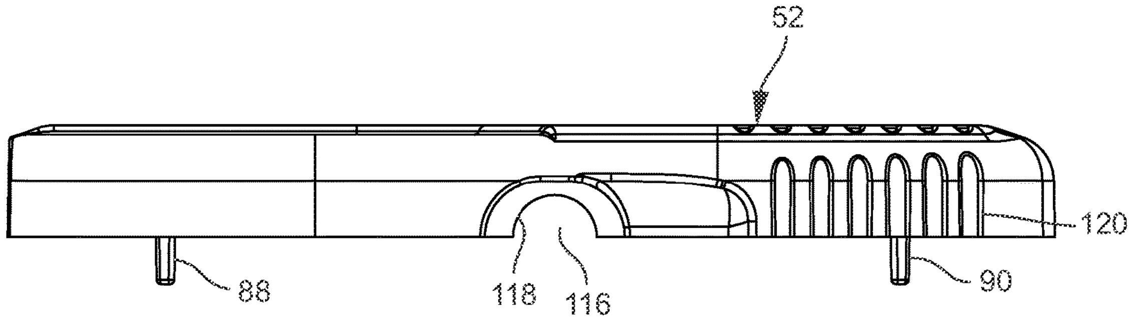
FIG. 18A is a top view of a first housing portion of the latch apparatus of FIG. 5.
Figure 18B:
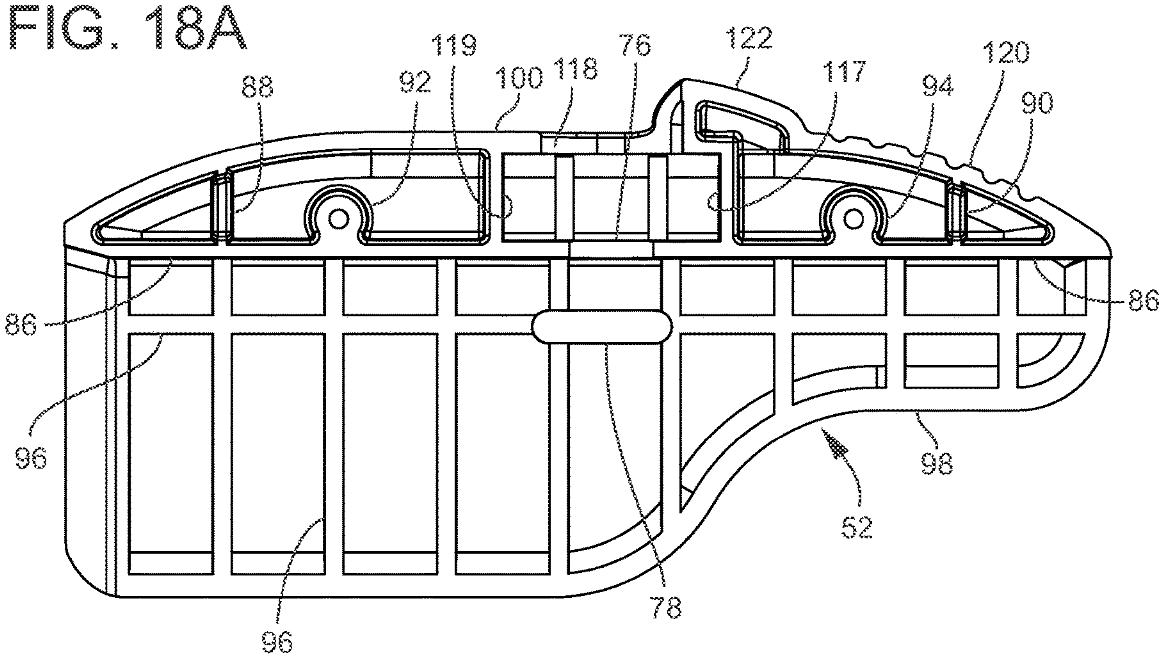
FIG. 18B is an elevation view of the inside of the first housing portion of the latch apparatus of FIG. 18A.
Figure 18C:
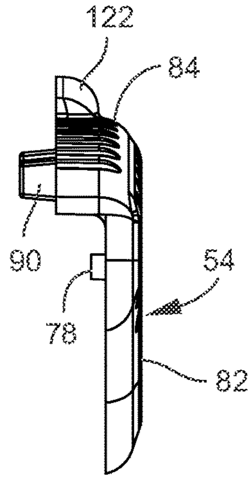
FIG. 18C is an end view of the first housing portion of the latch apparatus of FIG. 18A.
Figure 19A:
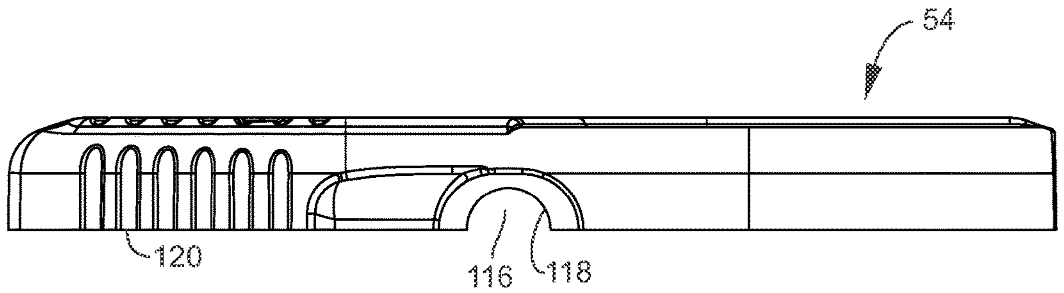
FIG. 19A is a top view of a second housing portion of the latch apparatus of FIG. 5.
Figure 19B:
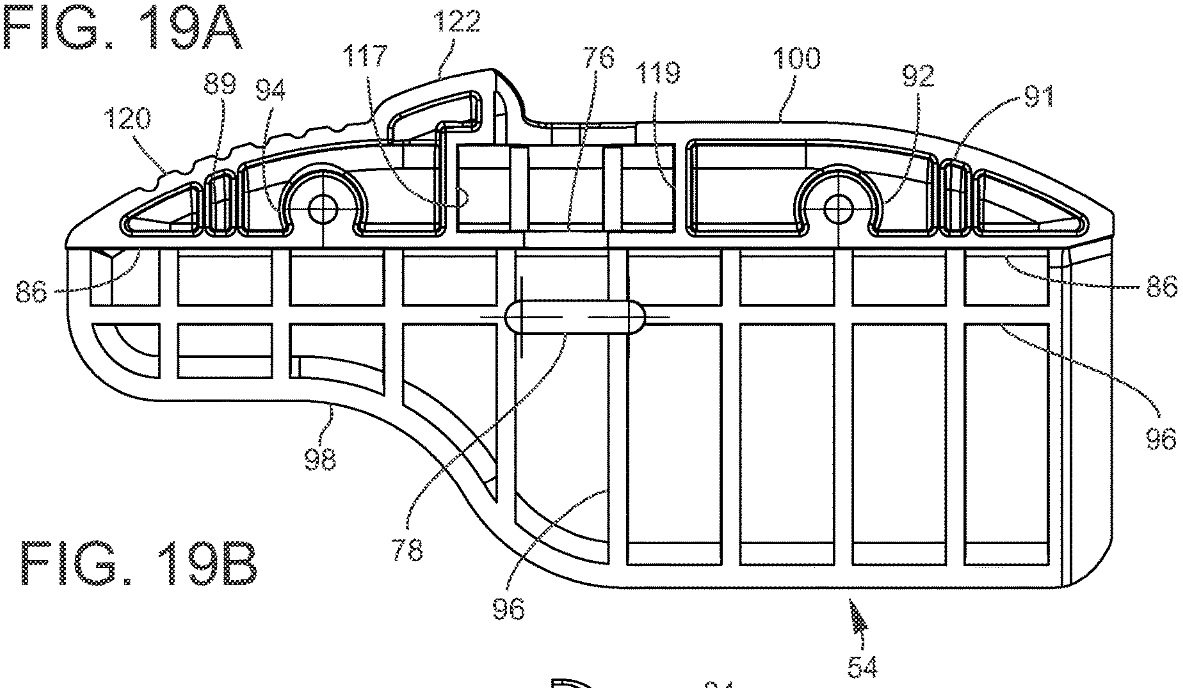
FIG. 19B is an elevation view of the inside of the second housing portion of the latch apparatus of FIG. 19A.
Figure 19C:
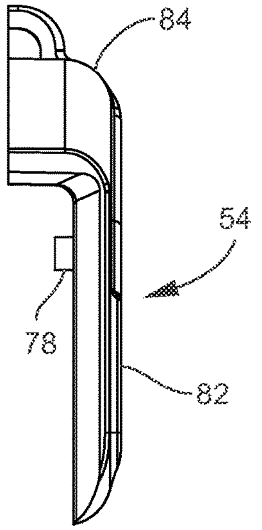
FIG. 19C is an end view of the second housing portion of the latch apparatus of FIG. 19A.
Figure 20A:
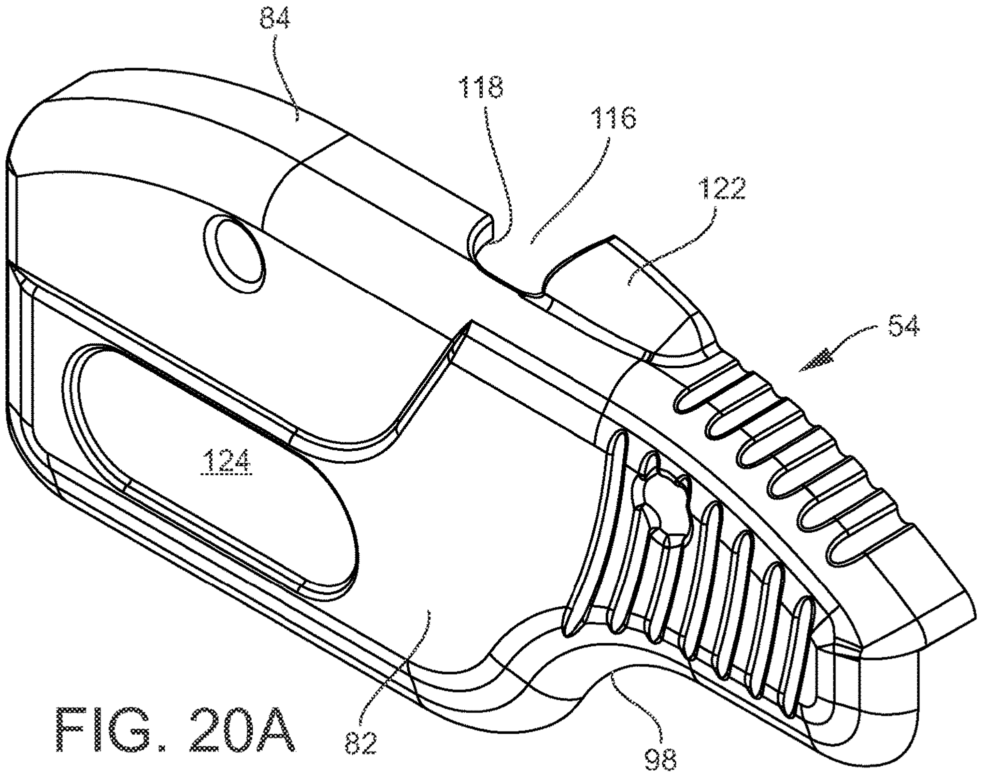
FIG. 20A is a perspective view of the outside of the second housing portion of FIG. 19B.
Figure 20B:
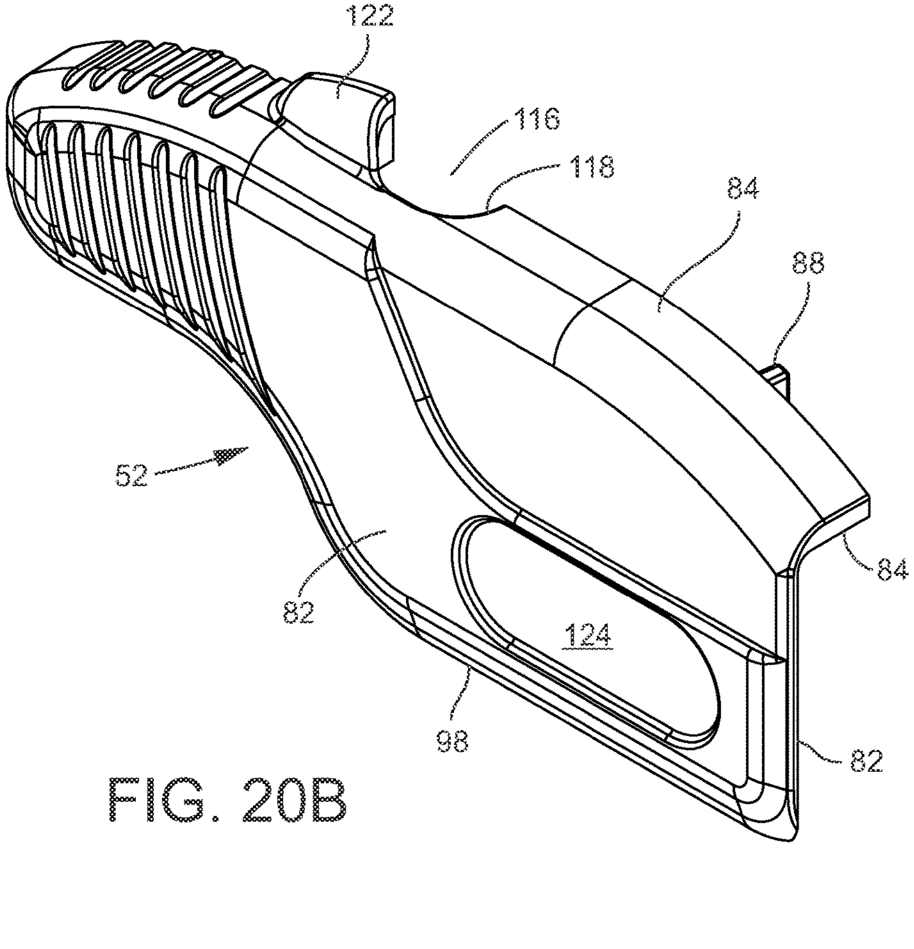
FIG. 20B is a perspective view of the outside of the first housing portion of FIG. 18B.

Threshold portion 128 of barrier frame first portion 12 and threshold portion 43 of barrier frame second portion 14 are engaged in a spaced apart relation by the inverted U-shaped connection 24 shown in FIGS. 1, 15A, 15B, 15C, 15D, 15E, 16A, and 16B. The connection 24 maintains the threshold portions 128 and 43 in a spaced apart but confronting or adjacent orientation. Each of the threshold portions 128, 43 includes a straight axis and the connection 24 maintains the straight axis of the threshold portions 128, 43 in a straight line with each other. Each of the threshold portions 128, 43 have a bottom face, top face, front face, and rear faces, each of which face defines a plane. The connection 24 maintains the planes of these bottom, top, front, and rear faces of the threshold portions 128, 43 in coplanar bottom, top, front, and rear planes, respectively. The connection 24 between the threshold first portion 128 and the threshold second portion 43 maintains the threshold first portion 128 and threshold second portion 43 in a straight line with each other and maintains the barrier frame first and second portions 12, 14 in a common plane with each other. The connection 24 includes a rigid elongate straight piece 410 having an inverted U-shaped section from end to end such that the elongate straight piece 410 is adjacent to, confronts, and makes contact with a top side section of each of the threshold first portion 128 and threshold second portion 43, such that the elongate straight piece 410 is adjacent to, confronts, and makes contact with a front side section of each of the threshold first portion 128 and threshold second portion 43, and such that the elongate straight piece 410 is adjacent to, confronts, and makes contact with a rear side section of each of the threshold first portion 128 and threshold second portion 43. The rigid elongate straight piece 410 is engaged to the threshold first portion 128 by a pair of first pin connectors 412. The rigid elongate straight piece 410 is engaged to the threshold second portion 43 by a pair of second pin connectors 414. Pin connectors 412 engage openings 416 in the rigid elongate straight piece 410 and openings 156, 158 in the threshold first portion 128. Pin connectors 414 engage openings 418 in the rigid elongate straight piece 410 and openings 156, 158 in the threshold second portion 43. Each of the pin connectors 412, 414 has a head that may be recessed in a top side 420 such that an uppermost portion of the head is no higher than an uppermost portion of the top side 420 so as to minimize threshold clearance. Or the head may lie upwardly beyond the top side 420 of the elongate rigid piece 410. Rigid elongate straight piece 410 includes a top side 420 that is straight and flat and defines a plane, a front side 422 that is straight and flat and defines a plane, and a rear side 424 that is straight and flat and defines a plane. Top, front, and rear sides 420, 422, 424 are of equal length. The inner faces of the top, front, and rear sides 420, 422, 424 for their entire surfaces make contact with top, front, and side surface sections of the threshold first portion 128 and threshold second portion 43. Connection 24 holds the axis of threshold portions 128, 43 in a straight line with each other such that the bottom sides of the threshold first and second portions 128, 43 define a plane, such that the front sides of the threshold first and second portions 128, 43 define a plane, such that the rear sides of the threshold first and second portions 128, 43 define a plane, and such that the top sides of the threshold first and second portions 128, 43 define a plane. The bottom edges 426, 428 of the front side 422 and rear side 424 of elongate straight piece 410 are spaced from the bottom face or bottom side of threshold first and second portions 128, 43, as shown in FIGS. 16A and 16B.

In operation, the gated barrier 10 arrives for the end user in a relatively small six sided box. Gated barrier 10 arrives with many of the panels 18 and 18.1 engaged with each other. This is possible because the end cap 184, 186, 252, 268, and 284 have end cap portions and support member engagement portions that are offset from each other. As to end cap 184, its end cap portion or annulus 190 is offset from its support member engagement portion 188, with a center of end cap portion 190 being on a straight line defined by a side 430 of support member engagement portion 1188. As to end cap 186, its end cap portion 200 is offset from its support member engagement portion 194, with a center of end cap portion 200 being on a straight line defined by a side 432 of support member engagement portion 194. As to end cap 252, its end cap portion 258 is offset from its support member engagement portion 254, with a center of end cap portion 258 being on a straight line defined by a side 434 of support member engagement portion 254. As to end cap 268, its end cap portion 274 is offset from its support member engagement portion 270, with a center of end cap portion 274 being on a straight line defined by a side 436 of support member engagement portion 270. As to end cap 284, its end cap portion 288 is offset from the support member engagement portion 286, with a center of end cap portion 288 being on a straight line defined by a side 438 of support member engagement portion 286. In other words, at each junction or at each junction apparatus 20, panel 18 and 18.1 can swing relative to each other for 270 degrees, with one of the positions being where panel 18 and 18.1 are adjacent to each other and parallel to each other. An endless number of panels 18 and 18.1 can be disposed parallel and adjacent to each other as long as the panels repeat in the manner of 18, 18.1, 18, 18.1, 18, 18.1, etc., where a panel 18 is engaged between two 18.1 panels, and where a panel 18.1 is engaged between two 18 panels. In light of the above, the length of the box in which gated barrier 10 is shipped is slightly greater than or about the same as the length of panels 18, 18.1. The length of the first and second barrier frame portions 12, 14 when engaged to each other are greater than the length of any of the panels 18, 18.1. The length of each of the first and second barrier frame portions 12, 14 is about equal to or slightly less than the length of each of the panels 18, 18.1. Length means the length of the lowermost horizontal support member 240 or the length of the uppermost horizontal support member 238 plus the length of the exterior portions of the end caps. Length of the barrier frame first and second portions 12, 14 means the length of the threshold portions 128, 43 plus the length of the end caps 186, 162.

The height of the barrier frame first and second portions 12, 14 is the same as the height of the panels 18, 18.1. In other words, the axis of the uppermost support member 62 of the gate 16 lies in a common plane with the axis of each of the uppermost support members 238 of each of the panels 18 and 18.1.

The bottommost faces or sides of the first and second threshold portions 128, 43 define a first plane, the bottommost faces of end caps 284 of panel 18.1 lie in this first plane, and the bottommost faces of end caps 268 of panel 18 also lie in this first plane. The bottommost faces of lowermost support member 240 of panels 18, 18.1 are spaced from and adjacent to this first plane. With such a spacing, bottommost support members 240 do not grab, or may minimally grab, and do not make contact with, or may make minimal contact with, a floor, or a carpet, or a rug, or the grass as panels 18 and 18.1 are rotated relative to each other such as when it is desired to change the shape of the gated barrier 10 from, for example, a playyard to, for example, a straight barrier. The bottommost faces of lowermost support member 240 of panels 18, 18.1 are coplanar with each other when set up with junction apparatus 20 disposed therebetween, such as shown in FIGS. 1, 2, and 3. The bottommost faces of lowermost support member 240 of panels 18, 18.1 define a first plane and the bottommost faces of threshold portions 128, 43 define a second plane, with such first and second planes offset from each other when the gated barrier 10 is set up, such as shown in FIGS. 1, 2, and 3.

One reason that such a relatively small six sided box may be employed is that the frame on both sides of the gate 16 can be broken down into the barrier frame first and second portions 12, 14. A first step to assemble the gated barrier 10 in the form of a playyard shown in FIG. 1 may be to connect the barrier frame first and second portions 12, 14 with the connection 24. A second step may be to engage the gate 16 to the barrier frame first and second portions 12, 14 by engaging pin portion 148 with threshold portion 128 and by engaging pivot pin 398 with plastic piece 136, hole 135 in bar 134, and hole 396 in pin receiver or plug 388. Further steps may not be necessary because panels 18 and 18.1 can lie back to back to each other as described above. However, if the panels 18 and 18.1 are to be assembled, such further steps include 1) engaging a first panel 18 to the barrier frame first portion 12 with a junction apparatus 20, then 2) engaging a second panel 18.1 to the first panel 18 with a junction apparatus 20, 3) then engaging a third panel 18 with the second panel 18.1 with a junction apparatus 20, then 4) engaging a fourth panel 18.1 with the third panel 18 with a junction apparatus 20, then 5) engaging a fifth panel 18 with the fourth panel 18.1 with a junction apparatus 20, and then 6) engaging the barrier frame second portion 14 with the fifth panel 18 with a junction apparatus 20. Such completes an endless playyard structure.

The endless playyard structure of FIG. 1 may have three or more panels 18 and 18.1. Where an odd number of panels 18 are desired for an endless playyard structure, no hybrid panels need to be prepared. Where an even number of panels 18 are desired, a panel 18.1 may be converted into a hybrid panel by taking off the upper end cap 184/lower end cap 284 combination on one end of the panel 18.1 and replacing such with an upper end cap 252/lower end cap 268 combination.

After the desired endless playyard structure has been assembled, gate 16 is opened by 1) depressing exterior button 56 and then sliding the latch apparatus 22 away from the inner end of horizontal support member 80 of barrier frame second portion 14 so the housing 50 clears the inner end of the horizontal support member 80, then 2) swinging arms 42 of third lock 26 out-of-the-way of threshold portion 43, then 3) swinging the gate 16 in either direction. Closing the gate 16 includes the steps of: 1) retracting the latch apparatus 22 such that the nose of the latch apparatus 22 is out-of-the-way of the inner end of the uppermost support member 80 of the barrier frame second portion 14, then 2) swinging the gate 16 to be in the plane defined by the first and second barrier frame portions 12, 14, then 3) sliding or extending the latch apparatus 22 such that the nose of the body 50 slides over and captures the inner end of the uppermost support member 80, then 4) swinging the arms 42 of the third lock 26 downwardly to engage the threshold portion 43.

Latch apparatus 22 does not include an automatic return. By a friction fit between housing 50 and horizontal support members 62 and 80, housing 50 stays at the location to which it is slid until it is manually moved again. The only automatic feature of latch apparatus 22 is the snapping out of exterior button 56 by interior button 58 when housing opening 76 slides over interior button 58 which then snaps up into housing opening 76.

To place or configure the gated barrier 10 in another form, such as the form shown in FIG. 3, a junction apparatus 20 between a panel 18.1 and a panel 18 is disassembled by rotating turning knob 298 until the upper joint having the end cap 252/end cap 184 combination is taken apart, whereby the tubular post support member 30 of such junction apparatus 20 can be removed, whereby the lower joint having the end cap 268/end cap 284 combination can be taken apart. Then junction apparatus 310 is assembled as described above using cap 314, cap 316, a pair of wall mounts 28, and the original tubular post support member 30. Then junction apparatus 312 is assembled as described above using cap 318, cap 320, a pair of wall mounts 28, and a second tubular post support member 30. The form shown in FIG. 3 can be configured into a number of forms, such as a long straight form. In such configuring, one or more junction apparatus 20 need not be taken apart. Such one or more junction apparatus 20 need merely be loosened by rotation somewhat of turning knob 298 such that teeth 192 of end cap 184 can rotate relative to teeth 260 of end cap 252. When the desired angle between two adjacent panels 18 and 18.1 is attained, then the turning knob 298 can be tightened to tighten teeth 192 with teeth 260 to prevent rotation. As noted above, two adjacent panels 18 and 18.1 can be fixed at any angle, depending upon the fineness of the teeth 192, 260, between zero degrees and 270 degrees.

Each of the junction portions of FIGS. 23A, 23B, 23C, 23D, and 23E may be referred to as a unit having first and second portions, with the first portion being an end cap portion sharing an axis with tubular post support member 30, and with a second portion being a horizontal support member engaging portion.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A gated barrier comprising:

a) a barrier frame first portion;

b) a barrier frame second portion;

c) a gate between the barrier frame first and second portions;

d) the barrier frame first portion comprising a first standard adjacent to and spaced from the gate;

e) the barrier frame second portion comprising a second standard adjacent to and spaced from the gate;

f) the barrier frame first portion comprising a threshold first portion extending from the barrier frame first portion;

g) the barrier frame second portion comprising a threshold second portion extending from the barrier frame second portion;

h) the gate pivotally engaged and adjacent to the barrier frame first portion;

i) the gate removably engaged to the barrier frame second portion, the gate being adjacent to the barrier frame second portion when engaged thereto;

j) a first panel having a first uppermost traversing member and a first lowermost traversing member, the first uppermost traversing member and first lowermost traversing member being spaced apart by a set of first support members;

k) a first uppermost junction and a first lowermost junction, the first uppermost junction and first lowermost junction engaging the barrier frame first portion to the first panel, the first uppermost junction and first lowermost junction being rotatable such that the first panel and barrier frame first portion are swingable relative to each other;

l) A second panel having a second uppermost traversing member and a second lowermost traversing member, the second uppermost traversing member and second lowermost traversing member being spaced apart by a set of second support members;

m) a second uppermost junction and a second lowermost junction, the second uppermost junction and second lowermost junction engaging the barrier frame second portion to the second panel, the second uppermost junction and second lowermost junction being rotatable such that the second panel and barrier frame second portion are swingable relative to each other; and n) the threshold first portion having a bottom defining a first plane, the threshold second portion having a bottom defining a second plane;

o) the first lowermost traversing portion of the first panel having a bottom defining a third plane, the second lowermost traversing portion of the second panel having a bottom defining a fourth plane;

p) wherein the first and second planes are coplanar and wherein the third and fourth planes are coplanar, the first and second planes being offset from the third and fourth planes;

q) the gate being a singleton gate such that the gated barrier includes only one gate;

r) wherein the gate is pivotally engaged to the threshold first portion of the barrier frame first portion at a first lower location, wherein the gate is engagable to a second lower location which second lower location is adjacent to the threshold second portion of the barrier frame second portion; and s) wherein the gate is removably engaged to the barrier frame second portion by a latch at an upper location;

t) a third panel having a third uppermost traversing member and a third lowermost traversing member, the third uppermost traversing member and third lowermost traversing member being spaced apart by a set of third support members;

u) a fourth panel having a fourth uppermost traversing member and a fourth lowermost traversing member, the fourth uppermost traversing member and fourth lowermost traversing member being spaced apart by a set of fourth support members;

v) a third uppermost junction and a third lowermost junction, the third uppermost junction and third lowermost junction engaging the third panel to the fourth panel, the third uppermost junction and third lowermost junction being rotatable such that the third panel and fourth panel are swingable relative to each other; and w) wherein the third uppermost junction comprises:

i) a toothed male disk end cap unit having teeth;

ii) a toothed female disk end cap unit having teeth;

iii) a turning knob below each of the toothed male disk end cap unit and toothed female disk end cap unit;

iv) the toothed male disk end cap unit having a threaded male portion, the toothed female disk end cap unit having an opening, and the turning knob having a threaded receiver, the threaded male portion of the toothed male disk end cap unit extending through the opening of the toothed female disk end cap unit and threadingly engaging the threaded receiver of the turning knob such that, when the turning knob is turned, the toothed male disk end cap unit and the turning knob are drawn toward each other to pinch the toothed female disk end cap unit between the toothed male disk end cap unit and turning knob and to engage the teeth of the toothed male disk end cap unit with the teeth of the toothed female disk end cap;

v) the toothed male disk end cap unit engaging one of the third uppermost traversing member and fourth uppermost traversing member;

vi) the toothed female end cap unit engaging one of the third uppermost traversing member and fourth uppermost traversing member;

vii) wherein the toothed female disk end cap unit includes an outermost portion that is also an annular portion;

viii) wherein the turning knob includes an outermost portion that is also an annular portion, the annular portions being adjacent to each other when the toothed female disk end cap unit is pinched between the toothed male disk end cap unit and the turning knob;

ix) the radii of the annular portions being about the same; and x) the outermost portion of the turning knob being adjacent to and remaining outside of the toothed female disk end cap unit when the toothed female disk end cap unit is pinched between the toothed male disk end cap unit and the turning knob, the outermost portion of the turning knob engaging an exterior of the toothed female disk end cap unit when the toothed female disk end cap unit is pinched between the toothed male disk end cap unit and the turning knob.

2. The gated barrier of claim 1, wherein the third lowermost junction comprises:

a) a lower male disk end cap unit;

b) a lower female disk end cap unit;

c) the lower male disk end cap unit having a male portion, the lower female disk end cap unit having female portion, the male portion of the lower male disk end cap unit engaging the female portion of the lower female disk end cap unit such that the lower male disk end cap unit and female disk end cap unit are rotatably engaged;

d) the lower male disk end cap unit engaging one of the third lowermost traversing member and fourth lowermost traversing member; and e) the female end cap unit engaging one of the third lowermost traversing member and fourth lowermost traversing member.

3. The gated barrier of claim 1, and further comprising a post extending between the third uppermost junction and the third lowermost junction.

4. The gated barrier of claim 1, wherein the first lowermost junction includes a bottom defining a fifth plane, wherein the second lowermost junction includes a bottom defining a sixth plane, the first, second, fifth, and sixth planes being coplanar.

5. The gated barrier of claim 1, wherein the third lowermost junction includes a bottom defining a fifth plane, wherein the second lowermost junction includes a bottom defining a sixth plane, the first, second, fifth, and sixth planes being coplanar.

6. A gated barrier comprising:

a) a barrier frame first portion;

b) a barrier frame second portion;

c) a gate between the barrier frame first and second portions;

d) the barrier frame first portion comprising a first standard adjacent to and spaced from the gate;

e) the barrier frame second portion comprising a second standard adjacent to and spaced from the gate;

f) the barrier frame first portion comprising a threshold first portion extending from the barrier frame first portion;

g) the barrier frame second portion comprising a threshold second portion extending from the barrier frame second portion;

h) the gate pivotally engaged and adjacent to the barrier frame first portion;

i) the gate removably engaged to the barrier frame second portion, the gate being adjacent to the barrier frame second portion when engaged thereto;

j) a first panel having a first uppermost traversing member and a first lowermost traversing member, the first uppermost traversing member and first lowermost traversing member being spaced apart by a set of first support members;

k) a first uppermost junction and a first lowermost junction, the first uppermost junction and first lowermost junction engaging the barrier frame first portion to the first panel, the first uppermost junction and first lowermost junction being rotatable such that the first panel and barrier frame first portion are swingable relative to each other;

l) A second panel having a second uppermost traversing member and a second lowermost traversing member, the second uppermost traversing member and second lowermost traversing member being spaced apart by a set of second support members;

m) a second uppermost junction and a second lowermost junction, the second uppermost junction and second lowermost junction engaging the barrier frame second portion to the second panel, the second uppermost junction and second lowermost junction being rotatable such that the second panel and barrier frame second portion are swingable relative to each other; and n) the threshold first portion having a bottom defining a first plane, the threshold second portion having a bottom defining a second plane;

o) the first lowermost traversing portion of the first panel having a bottom defining a third plane, the second lowermost traversing portion of the second panel having a bottom defining a fourth plane;

p) wherein the first and second planes are coplanar and wherein the third and fourth planes are coplanar, the first and second planes being offset from the third and fourth planes;

q) the gate being a singleton gate such that the gated barrier includes only one gate;

r) wherein the gate is pivotally engaged to the threshold first portion of the barrier frame first portion at a first lower location, wherein the gate is engagable to the threshold second portion of the barrier frame second portion at a second lower location;

s) wherein the gate is removably engaged to the barrier frame second portion by a latch at an upper location;

t) wherein the second lower location includes a pivot arm pivotable between the gate and the threshold second portion to prevent or permit a swinging of the gate, wherein the pivot arm is pivotally affixed to a structure that receives a horizontal gate frame portion in a first receiver end of the structure;

u) a third panel having a third uppermost traversing member and a third lowermost traversing member, the third uppermost traversing member and third lowermost traversing member being spaced apart by a set of third support members;

v) a fourth panel having a fourth uppermost traversing member and a fourth lowermost traversing member, the fourth uppermost traversing member and fourth lowermost traversing member being spaced apart by a set of fourth support members;

x) a third uppermost junction and a third lowermost junction, the third uppermost junction and third lowermost junction engaging the third panel to the fourth panel, the third uppermost junction and third lowermost junction being rotatable such that the third panel and fourth panel are swingable relative to each other;

y) wherein the third uppermost junction comprises:

i) a toothed upper disk end cap having teeth;

ii) a toothed lower disk end cap having teeth and an opening;

iii) a turning knob below each of the toothed upper disk end cap and toothed lower disk end cap, the turning knob having a threaded receiver;

iv) a threaded male portion extending from the toothed upper disk end cap, through the opening of the toothed lower disk end cap, and threadingly engaging the threaded receiver of the turning knob such that, when the turning knob is turned, the toothed upper disk end cap and the turning knob are drawn toward each other to pinch the toothed lower disk end cap between the toothed upper disk end cap and turning knob and to engage the teeth of the toothed upper disk end cap with the teeth of the toothed lower disk end cap;

v) the toothed upper disk end cap engaging one of the third uppermost traversing member and fourth uppermost traversing member;

vi) the toothed lower disk end cap engaging one of the third uppermost traversing member and fourth uppermost traversing member;

vii) wherein the toothed lower disk end cap includes an outermost portion that is also an annular portion;

viii) wherein the turning knob includes an outermost portion that is also an annular portion, the annular portions being adjacent to each other when the toothed lower disk end cap is pinched between the toothed upper disk end cap and the turning knob; and ix) the outermost portion of the turning knob being adjacent to and remaining outside of the toothed lower disk end cap when the toothed lower disk end cap is pinched between the toothed upper disk end cap and the turning knob, the outermost portion of the turning knob engaging an exterior of the toothed lower disk end cap when the toothed lower disk end cap is pinched between the toothed upper disk end cap and the turning knob; and z) wherein the structure includes the first receiver end, wherein the gate includes the horizontal gate frame portion, wherein the first receiver end of the structure receives the horizontal gate frame portion, wherein the horizontal gate frame portion includes a first end adjacent to the barrier frame first portion and a second end adjacent to the barrier frame second portion, and wherein the receiving end of the structure receives the second end of the horizontal gate frame portion.

7. The gated barrier of claim 6, wherein the third lowermost junction comprises:

a) a lower male disk end cap unit;

b) a lower female disk end cap unit;

c) the lower male disk end cap unit having a male portion, the lower female disk end cap unit having female portion, the male portion of the lower male disk end cap unit engaging the female portion of the lower female disk end cap unit such that the lower male disk end cap unit and female disk end cap unit are rotatably engaged;

d) the lower male disk end cap unit engaging one of the third lowermost traversing member and fourth lowermost traversing member; and e) the female end cap unit engaging one of the third lowermost traversing member and fourth lowermost traversing member.

8. The gated barrier of claim 6, and further comprising a post extending between the third uppermost junction and the third lowermost junction.

9. The gated barrier of claim 6, wherein the first lowermost junction includes a bottom defining a fifth plane, wherein the second lowermost junction includes a bottom defining a sixth plane, the first, second, fifth, and sixth planes being coplanar.

10. The gated barrier of claim 6, wherein the third lowermost junction includes a bottom defining a fifth plane, wherein the second lowermost junction includes a bottom defining a sixth plane, the first, second, fifth, and sixth planes being coplanar.

* * * * *